United States Patent
Shenoy et al.

(10) Patent No.: US 10,625,674 B2
(45) Date of Patent: Apr. 21, 2020

(54) SYSTEM AND METHOD FOR GENERATION OF A PREVENTIVE ALERT

(71) Applicant: SONY CORPORATION, Tokyo (JP)

(72) Inventors: Nagesh B. T. Shenoy, Bangalore (IN); Pramod Chintalapoodi, San Diego, CA (US); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/944,928

(22) Filed: Apr. 4, 2018

(65) Prior Publication Data

US 2018/0222388 A1 Aug. 9, 2018

Related U.S. Application Data

(63) Continuation of application No. 14/855,578, filed on Sep. 16, 2015, now Pat. No. 9,969,329.

(51) Int. Cl.
*B60Q 9/00* (2006.01)
*G08G 1/01* (2006.01)
*G08G 1/0967* (2006.01)
*G08G 1/16* (2006.01)

(52) U.S. Cl.
CPC .......... *B60Q 9/008* (2013.01); *G08G 1/0112* (2013.01); *G08G 1/096775* (2013.01); *G08G 1/164* (2013.01)

(58) Field of Classification Search
CPC ....... G08G 1/16–166; G08G 1/096775; G08G 1/096783; G08G 1/096791; G01S 13/931; G01S 17/023; G01S 2013/936; H04W 4/046
USPC ........ 340/435, 471–473, 933, 935–937, 901, 340/905; 701/300, 301
See application file for complete search history.

(56) References Cited

U.S. PATENT DOCUMENTS

| | | | | |
|---|---|---|---|---|
| 6,813,562 B2* | 11/2004 | Altan | ............. | B60W 30/16 340/436 |
| 8,527,172 B2* | 9/2013 | Moshchuk | ............. | B60W 10/184 701/48 |
| 9,266,472 B2* | 2/2016 | Freitas | ............. | B60Q 9/008 |
| 2002/0120374 A1* | 8/2002 | Douros | ............. | G07C 5/0808 701/34.4 |
| 2007/0078570 A1* | 4/2007 | Dai | ............. | G08G 1/096791 701/1 |

(Continued)

FOREIGN PATENT DOCUMENTS

DE 102013021835 A1 6/2015
JP 2005-242552 A 9/2005

OTHER PUBLICATIONS

International Search Report for PCT Application No. PCT/JP2016/004005, dated Feb. 1, 2017, 7 pages.

(Continued)

*Primary Examiner* — Emily C Terrell
(74) *Attorney, Agent, or Firm* — Chip Law Group

(57) ABSTRACT

Various aspects of a system and method for generation of a preventive alert are disclosed herein. The system comprises one or more circuits in a vehicle that retrieves sensor data associated with the vehicle and/or obstacle information generated by one or more sensors of the vehicle, along a path of the vehicle. The system further comprises one or more circuits that communicates to a server, a set of data based on the retrieved sensor data and/or the retrieved obstacle information. The generation of an alert to one or more vehicles is controlled by the server, based on the communicated set of data.

20 Claims, 10 Drawing Sheets

(56) References Cited

U.S. PATENT DOCUMENTS

| | | | | |
|---|---|---|---|---|
| 2007/0219720 | A1* | 9/2007 | Trepagnier | B60W 30/00 701/300 |
| 2010/0284382 | A1 | 11/2010 | Stahlin et al. | |
| 2012/0034905 | A1* | 2/2012 | Stahlin | G08G 1/205 455/414.1 |
| 2012/0101701 | A1* | 4/2012 | Moshchuk | B60W 10/184 701/70 |
| 2013/0147955 | A1 | 6/2013 | Oosugi | |
| 2013/0241182 | A1* | 9/2013 | Rao | B60R 21/0134 280/735 |
| 2015/0264548 | A1* | 9/2015 | Lee | H04W 4/90 370/335 |
| 2015/0317523 | A1* | 11/2015 | Clark | G06K 9/00805 348/148 |
| 2016/0009276 | A1* | 1/2016 | Moeller | B60W 30/09 701/41 |
| 2016/0163198 | A1 | 6/2016 | Dougherty | |
| 2016/0613198 | * | 6/2016 | Dougherty | G08G 1/162 340/905 |

OTHER PUBLICATIONS

Frank Brennecke, "Harmonised eCall European Pilot" Heero, 02.2—eCall systems functionalities' specification, Retrieved from the Internet: URL:http://www.heero-pilot.eu/ressource/static/files/heero2 wp2 del d2 2 functionalspecification v1-I.pdf, Apr. 29, 2013, 56 pages.
Invitation to Pay Additional Fees and Partial Search Report of PCT Application No. PCT/JP2016/004005, dated Dec. 5, 2016, 08 pages.
Notice of Allowance for U.S. Appl. No. 14/855,578, dated Jan. 22, 2018, 6 pages.
Advisory Action for U.S. Appl. No. 14/855,578, dated Jun. 15, 2017, 5 pages.
Non-Final Office Action for U.S. Appl. No. 14/855,578, dated Sep. 1, 2017, 6 pages.
Final Office Action for U.S. Appl. No. 14/855,578, dated Apr. 14, 2017, 8 pages.
Non-Final Office Action for U.S. Appl. No. 14/855,578, dated Oct. 26, 2016, 15 pages.

* cited by examiner

SYSTEM AND METHOD FOR GENERATION OF A PREVENTIVE ALERT

CROSS REFERENCE TO RELATED APPLICATIONS

The present application is a continuation application of U.S. patent application Ser. No. 14/855,578, filed Sep. 16, 2015, now U.S. Pat. No. 9,969,329, the entire content of which is hereby incorporated by reference.

FIELD

Various embodiments of the disclosure relate to a system and method for generation of a preventive alert.

BACKGROUND

Recent advancements in the field of vehicle alert systems have led to the development of in-vehicle systems that provide assistance in case of an emergency situation, such as an accident of a vehicle. In such an emergency situation, an in-vehicle system may transmit a standardized set of data associated with the vehicle to a remote server. Such data may include information to uniquely identify the vehicle. Based on the standardized set of data, a remote server may establish a communication link with one or more passengers of the vehicle, via the in-vehicle system. Based on messages exchanged over the established communication link, the remote server may request one or more other network entities, to provide emergency services to the vehicle and/or one or more passengers of the vehicle.

In certain scenarios, a driver of the vehicle may not be aware of stationary or moving obstacles, road conditions, and/or traffic conditions on the road, and may end up in a potentially dangerous situation, such as an accident. Further, the vehicle may get stuck on the road due to a fault or a breakdown, and may pose a risk of being involved in a collision with other passing vehicles. In such scenarios, it may be desirable to provide a real-time, preventive alert to the drivers of a set of vehicles approaching towards a hazardous portion of a road that may contain one or more stationary and/or moving obstacles. The preventive alert may be based on data collected from the vehicle and/or another set of vehicles that have already passed through and/or are stuck in such a portion of the road.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for generation of a preventive alert is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
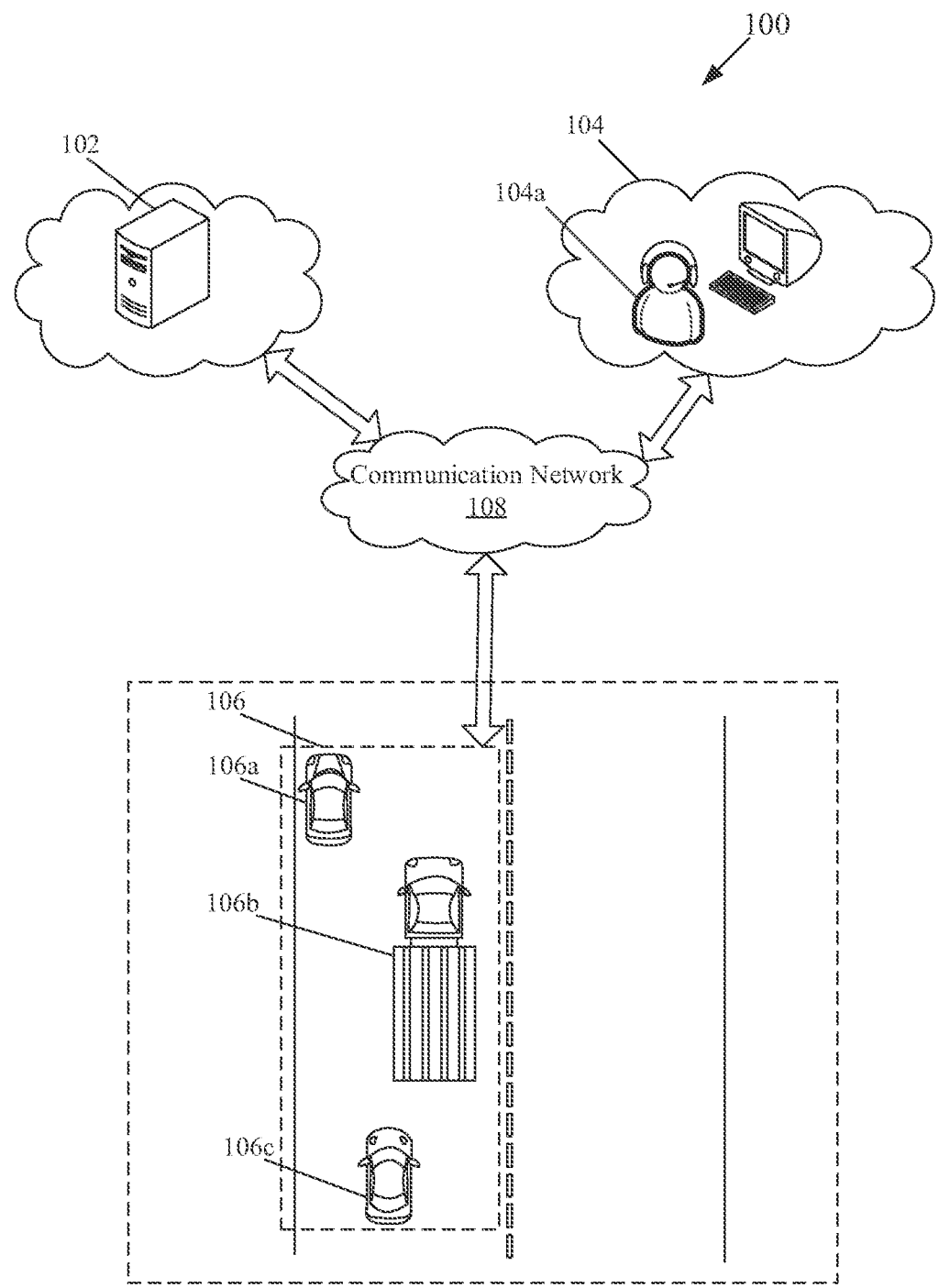
FIG. 1 is a block diagram that illustrates a network environment for generation of a preventive alert, in accordance with an embodiment of the disclosure.

The following described implementations may be found in the disclosed system and method for generation of a preventive alert. Exemplary aspects of the disclosure may comprise a first method for retrieval of sensor data associated with a vehicle and/or obstacle information along a path of the vehicle. The retrieved sensor data and/or the obstacle information may be generated by one or more sensors of the vehicle. Based on the retrieved sensor data and/or the retrieved obstacle information, a set of data may be generated and communicated to a server. The generation of an alert to one or more other vehicles may be controlled by the server based on the communicated set of data.

The format of the communicated set of data may be in accordance with a format of minimum set of data (MSD) implemented in emergency call (eCall) mechanism. The retrieved obstacle information may be generated based on an imaging device associated with the vehicle. Further, the alert may correspond to a preventive indication to avoid an accident of said one or more other vehicles. The alert may be received by the one or more other vehicles from the server based on the set of data communicated by the vehicle to the server. The generated sensor data may comprise one or more of a direction of travel, lane information, a vehicle type, a vehicle identification number, a vehicle propulsion storage type, a geospatial position, a previous location, a number of passengers, a status of hazard indicator, a status of turn signal indicator, a status of lane change indicator, a steering angle, a yaw rate, a speed, a rate of change of speed of the vehicle, climate information, deployment of airbags, brightness level information of environment outside the vehicle along the path, a static image or video image captured by an imaging system on the vehicle, a date and time information, and/or a type or characteristics of a sensor that generates the sensor data of the vehicle and/or detects the obstacle information along the path. The received obstacle information may comprise one or more of a stationary obstacle, an animal, a tree, a landslide, another stationary vehicle present on the path, and/or danger level information of a detected obstacle for a collision. The received obstacle information may further comprise moving obstacles such as a slow speed animal, bicycle, motorcycle, pedestrian, vehicle and/or road condition on the path such as potholes and/or a broken down vehicle on the path. In accordance with an embodiment, the set of data may indicate presence of an obstacle along the path of the vehicle. The generation of the set of data may be performed when the vehicle is equipped with the ADAS equipment.

In accordance with an embodiment, the communicated set of data may indicate that: the speed of the vehicle is below a speed threshold value, the vehicle is decelerated at a rate above a threshold, the hazard indicator of the vehicle is switched ON for a time period longer than a time period threshold value, and/or the turn signal indicator of the vehicle is switched ON to indicate lane change information.

In accordance with an embodiment, the communicated set of data may indicate an imminent threat of collision to the vehicle along the path. In accordance with an embodiment, the communicated set of data may indicate a potential threat of collision to the vehicle along the path. In accordance with an embodiment, the communicated set of data may indicate one or more of a level of a risk of a collision or an accident of the vehicle, and a geographical location of the vehicle along the path.

In accordance with an embodiment, the set of data may comprise a confidence level of a presence of an obstacle. The confidence level of presence of the obstacle may be determined based on characteristics of each of the one or more sensors and/or the generated sensor data.

The received alert may comprise one or more of visual information, haptic information, and/or audio information. In accordance with an embodiment, the display of the received alert in the vehicle may be controlled by use of one of a heads-up display (HUD), an augmented reality (AR)-HUD, a driver information console (DIC), a see-through display, or a smart-glass display. In accordance with an embodiment, the electronic control unit may utilize an imaging device, a radio wave-based object detection device, a laser-based object detection device, and/or a wireless communication device to detect the sensor data associated with the vehicle and/or the obstacle information along the path of the vehicle. In accordance with an embodiment, the received alert may be a voice-based broadcast message, a text-based broadcast message, or activation of an alarm installed in the vehicle.

Another exemplary aspect of the disclosure may comprise a second method for generation of a preventive alert. The method may comprise receipt of a set of data from one or more vehicles. The received set of data may comprise sensor data of the one or more vehicles, road conditions of a path, and/or obstacle information along a path of the one or more vehicles. Based on the received set of data, generation of an alert to one or more other vehicles may be controlled.

The received sensor data may comprise one or more of a direction of travel, lane information, a vehicle type, a vehicle identification number, a vehicle propulsion storage type, a geospatial position, a previous location, a number of passengers, a status of hazard indicator, a status of turn signal indicator, a status of lane change indicator, a steering angle, a yaw rate, a speed, a rate of change of speed of the one or more vehicles, climate information, deployment of airbags, brightness level information of environment outside the one or more vehicles along the path, a static image or video image captured by an imaging system on a vehicle, a date and time information, and/or a type or characteristics of a sensor that generates the sensor data of the one or more vehicles and/or detects the obstacle information along the path. The received obstacle information may comprise one or more of a stationary obstacle, an animal, a tree, a landslide, another stationary vehicle present on the path, and/or danger level information of the detected obstacle for a collision. In accordance with an embodiment, the received set of data may indicate presence of an obstacle along the path of the one or more vehicles. The one or more vehicles may be equipped with Advanced Driver Assistance System (ADAS).

In accordance with an embodiment, the generation of the alert to the one or more other vehicles may be controlled when the set of data is received from a first set of the one or more vehicles. The first set of the one or more vehicles may be located at a first location along the path of the one or more vehicles moving in a first direction. The generation of the alert may be controlled when number of vehicles in the first set of the one or more vehicles is higher than a first threshold value. In accordance with an embodiment, the first threshold value may be configurable based on one or more of the first location, a traffic condition associated with a portion of the path, a manual input provided by a user, and/or a confidence level associated with the received set of data. In accordance with an embodiment, the generation of the alert to the one or more other vehicles may be controlled in a vicinity of the first location along the path of the one or more vehicles moving in the first direction.

In accordance with an embodiment, the received set of data may indicate that the speed of the one or more vehicles is below a speed threshold value, the hazard indicator of the one or more vehicles is switched ON for a time period longer than a time period threshold value, and/or the turn signal indicator of the one or more vehicles is switched ON to indicate lane change information.

In accordance with an embodiment, the generation of the alert to the one or more other vehicles may be controlled when the set of data is received at a second location along the path of the one or more vehicles moving in a second direction. The generation of the alert may be controlled when the number of vehicles in the second set of the one or more vehicles is higher than a second threshold value.

In accordance with an embodiment, the second threshold value may be configured based on one or more of the second location, a traffic condition associated with a portion of the path, a manual input provided by a user, and/or a confidence level associated with the received set of data. In accordance with an embodiment, the generation of the alert to the one or more other vehicles may be controlled in a vicinity of the second location along the path of the one or more vehicles moving in the second direction.

FIG. 1 is a block diagram that illustrates a network environment for generation of preventive alert for one or more vehicles in motion, in accordance with an embodiment of the disclosure. With reference to FIG. 1, there is shown a network environment 100 that may comprise a Public Safety Answering Point (PSAP) 102, a Traffic Management Center (TMC) 104, a set of vehicles 106, and a communication network 108. The TMC 104 may further comprise an operator 104a to issue alerts. The set of vehicles 106 may further comprise one or more vehicles, such as the vehicles 106a, 106b, and 106c. The set of vehicles 106 may be communicatively coupled to the PSAP 102 and/or the TMC 104, via the communication network 108. The network environment 100 may be compliant with a standard of emergency call (eCall) so that when the set of vehicles 106 have an accident, a standardized set of data, such as a minimum set of data (MSD), may be sent to the PSAP 102.

The PSAP 102 may comprise one or more servers with suitable logic, circuitry, interfaces, and/or code that may be configured to receive a set of data from the set of vehicles 106, via the communication network 108. The one or more servers of the PSAP 102 may be implemented as cloud servers. The PSAP 102 may be further configured to control generation of an alert based on the received set of data. The PSAP 102 may be further configured to communicate the generated alert to the set of vehicles 106 and/or the TMC 104, via the communication network 108. The PSAP 102 may correspond to a pre-defined geographic location. Based on the pre-defined geographic location, a unique identification number, such as a location-enhanced emergency number "E112", may be assigned to the PSAP 102. The set of vehicles 106 may be in the geographic location served by the PSAP 102. The set of vehicles 106 may communicate with the PSAP 102 based on the unique identification number assigned to the PSAP 102. The PSAP 102 may be compliant with the $3^{rd}$ Generation Partnership Project Technical Specifications (3GPP TS) 22.101, "Service aspects; Service principles" and 3GPP TS 26.967, "eCall Data Transfer, In-band modem solution", known in the art.

The TMC 104 may comprise one or more servers with suitable, logic, circuitry, interfaces, and/or code that may be configured to receive the generated alert from the PSAP 102. The TMC 104 may be configured to establish a connection with the set of vehicles 106. The TMC 104 may be further configured to broadcast the received alert to the set of vehicles 106 present in the pre-defined geographic location served by the PSAP 102. The operator 104a, in the TMC 104, may be configured to manually broadcast the received alert to the set of vehicles 106. The one or more servers of the TMC 104 may be implemented based on one or more technologies known in the art.

The set of vehicles 106 may comprise the vehicles 106a, 106b, and/or 106c that may be in motion on a road. The vehicles 106a, 106b, and/or 106c, in the set of vehicles 106 may be configured to communicate with each other based on a vehicle-to-vehicle (V2V) communication, via the communication network 108. The set of vehicles 106 may be equipped with various components and systems that may comprise a suitable, logic, circuitry, interfaces, and/or code that may be configured to communicate the set of data to the PSAP 102. The set of vehicles 106 may be equipped with Advanced Driver Assistance System (ADAS) and/or sensing devices. Based on the ADAS and/or the sensing devices, the set of vehicles 106 may be configured to detect obstacle information. The set of vehicles 106 may be further configured to receive an alert generated by the PSAP 102 that may be rendered for the passengers of the set of vehicles 106. Examples of the set of vehicles 106 may include, but are not limited to, an automotive vehicle, a hybrid vehicle, and/or a vehicle that uses one or more distinct renewable or non-renewable power sources. Such renewable or non-renewable power sources may be a fossil fuel, electric propulsion, hydrogen fuel, solar-energy, and/or other forms of alternative energy sources.

The communication network 108 may include a medium through which the PSAP 102, TMC 104, and/or the set of vehicles 106 may communicate with each other. Examples of the communication network 108 may include, but are not limited to, a dedicated short-range communication (DSRC) network, a mobile ad hoc network (MANET), a vehicular ad hoc network (VANET), Intelligent vehicular ad-hoc network (InVANET), Internet based mobile ad hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the network environment 100 may be configured to connect to the communication network 108, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term evolution (LTE), File Transfer Protocol (FTP), ZigBee, EDGE, infrared (IR), and/or Bluetooth (BT) communication protocols.

In operation, the various components and systems of the set of vehicles 106, such as the vehicles 106a, 106b, and/or 106c, may be in a powered ON state. The PSAP 102 may be configured to establish a communicative connection with each of such various components and systems of the set of vehicles 106 in the powered ON state. In accordance with an embodiment, the various components and systems of the set of vehicles 106 may correspond to the ADAS, communicatively connected to the PSAP 102, via the communication network 108.

In accordance with an embodiment, the set of vehicles 106 may be configured to transmit a standardized set of data, such as the MSD, to the PSAP 102, in an emergency situation when the set of vehicles 106 has an accident. Such transmitted MSD may be compliant with a standard of the emergency call (such as 3GPP TS 22.101, known in the art). In accordance with an embodiment, the set of vehicles 106 may be configured to detect a dangerous situation on the path based on sensor data sensed by the set of vehicles 106. In such a case, the MSD may be utilized to transmit the sensed data to the PSAP 102. In accordance with an embodiment, the MSD may comprise a field that indicates presence of an obstacle along a path of the set of vehicles 106. Such an obstacle may correspond to one or more stationary and/or slow-moving obstacles. Data values in the data field that indicate the one or more stationary and/or slow-moving obstacles may be referred to as first value, hereinafter. Further, the first value may correspond to data associated with vehicles that may or may not be equipped with the ADAS.

In accordance with an embodiment, the data field may correspond to sensor data of the set of vehicles 106. The field in the MSD may indicate a change in one or more motion and/or vehicle parameters. Such a change in the one or more motion and/or vehicle parameters may correspond to a change in speed of the set of vehicles 106 below a speed threshold value. The change in the one or more motion and/or vehicle parameters may further correspond to a hazard indicator of the set of vehicles 106 switched ON for a time period longer than a time period threshold value. The change in one or more motion and/or vehicle parameters may further correspond to a turn signal indicator of the set of vehicles 106 switched ON to indicate lane change information. Data values in the data field that indicate the change in one or more motion and/or vehicle parameters may be referred to as a second value, hereinafter. Further, the second value may correspond to data associated with vehicles that may not be equipped with the ADAS. Notwithstanding, the disclosure may not be so limited, and the data structure of the MSD may correspond to the data structure of the minimum set of data used for the eCall, known in the art, without limiting the scope of the disclosure.

In accordance with an embodiment, the various components and systems of one or more vehicles from the set of vehicles 106 may be equipped with the ADAS that is configured to detect one or more stationary and/or slow-moving obstacles on a road. In accordance with an embodiment, the detection of the one or more stationary and/or slow-moving obstacles may be based on the ADAS in conjunction with a radio wave-based object detection device, or a laser-based object detection device, in scenarios where the visibility of the road is below a threshold value. The detected stationary and/or slow-moving obstacles may correspond to one or more of an animal, a tree, a landslide, and/or another stationary vehicle present on the road on which the set of vehicles 106 are in motion. In accordance with an embodiment, the ADAS may detect presence and/or a type of the obstacle along a path. The ADAS may include an imaging system to capture one or more images in a forward-facing direction of the set of vehicles 106. In accordance with an embodiment, the imaging device may correspond to a camera that may be mounted on the body of the one or more vehicles from the set of vehicles 106. In accordance with an embodiment, the imaging device may correspond to a camera that may be integrated in the body of the one or more vehicles from the set of vehicles 106. Based on the captured one or more images, the ADAS may detect the obstacle and/or determine the type of the obstacle, such as the animal, tree, breakdown vehicle, slow moving life-form, slow moving vehicle, pothole, accident, or any other obstacle on the road that may cause an accident for the one or more vehicles on the road.

In accordance with an embodiment, the ADAS in the one or more vehicles may be configured to update the data field of the MSD with the first value based on the detected one or more stationary and/or slow-moving obstacles. The ADAS may be further configured to update the data field of the MSD with the second value based on the one or more motion and/or vehicle parameters associated with the one or more vehicles. The ADAS may be further configured to transmit the MSD with the updated fields to the PSAP 102, via the communication network 108.

In accordance with an embodiment, various components and systems of the one or more vehicles from set of vehicles 106 may not be equipped with the ADAS. The sensing devices in the one or more vehicles may be configured to detect a change in one or more motion and/or vehicle parameters. Such a detected change may include, but is not limited to, a change in direction of travel, lane information, vehicle speed, turn signal indication, a steering angle, and/or a yaw rate of the one or more vehicles. In accordance with an embodiment, such a detection of one or more motion and/or vehicle parameters may be based on a motion camera, a radio detection and ranging (RADAR) equipment coupled with a camera, and/or a Light Detection and Ranging (LIDAR) equipment installed in the one or more vehicles. Notwithstanding, the disclosure may not be so limited, and the set of vehicles 106 may comprise one or more vehicles equipped with ADAS and one or more vehicles not equipped with ADAS, without limiting the scope of the disclosure.

In accordance with an embodiment, the various components and systems in the one or more vehicles not equipped with ADAS may be configured to update the data field of the MSD. The various components and systems may be configured to update the data field of the MSD with a second value based on the one or more motion and/or vehicle parameters associated with the one or more vehicles. In accordance with an embodiment, the various components and systems may be configured to update the data field of the MSD with the second value when the speed of the one or more vehicles is less than a speed threshold value. The various components and systems may be further configured to update the data field of the MSD with a second value when hazard indicators of the one or more vehicles are switched ON for a time period longer than a time period threshold value. The various components and systems may be further configured to update the data field of the MSD with the second value when turn signal indicators of the one or more vehicles are switched ON to indicate lane change information. The various components and systems may be further configured to transmit the updated MSD to the PSAP 102, via the communication network 108.

The various components and systems of the one or more vehicles (with or without ADAS) may be configured to associate a confidence level with sensor data generated by each sensing device. The confidence level may indicate the reliability of the occurrence of the detected stationary and/or slow-moving obstacle. The confidence level may further indicate the reliability of the detected change in one or more motion and/or vehicle parameters. The confidence level may vary based on a type of the sensing device. For example, when the sensor data is visually sensed data from a camera, the confidence level associated with the sensor data may be higher than a threshold value. The confidence level may further vary based on a specification of a sensing device of the one or more vehicles, such as a resolution of an image being captured. For example, the confidence level of a sensing device with a high resolution camera, may be set higher than that of a sensing device with low resolution camera. Different climatic conditions may be considered to assign the confidence level. For example, when the sensor data corresponds to a visually sensed data captured in poor climate conditions and/or poor brightness level associated with the environment outside the one or more vehicles, the confidence level associated with the sensor data may be lower than the threshold value. In another example, when the sensor data corresponds to physically sensed data, such as a gyro sensor-based data, the confidence level associated with the sensor data may be lower than the threshold value. In accordance with an embodiment, the confidence level of the sensing device may be changed based on a user preference.

In accordance with an embodiment, the confidence level of the sensing device may be changed based on a time or a geographical location sensed by the sensing device. For example, the confidence level may be set lower during nighttime as compared to daytime. Such a low confidence level may be attributed to a low brightness level during the nighttime. Further, the confidence level may be set lower in urban areas as compared to rural areas and/or highways. Such a low confidence level may be attributed to a complexity associated with a judgment of an obstacle in the urban areas. Notwithstanding, the disclosure may not be so limited, and the confidence level may vary based on size of one or more detected stationary and/or slow moving obstacles, a relative speed between the vehicle 106 and the obstacle and a speed of a vehicle from the set of vehicles 106, without limiting the scope of the disclosure.

The PSAP 102 may be configured to receive the MSD with the updated fields that correspond to the set of vehicles 106, via the communication network 108. Based on the received MSD from each of the set of vehicles 106, the PSAP 102 may be configured to determine the first value and/or the second value for each of the set of vehicles 106. The PSAP 102 may be further configured to determine a count of the vehicles from the MSD received from the set of vehicles 106. The PSAP 102 may be further configured to determine one or more motion and/or vehicle parameters from the received MSD for each of the set of vehicles 106.

In accordance with an embodiment, the PSAP 102 may be configured to determine a location and a direction of motion of each of the set of vehicles 106 for which the data field in the MSD corresponds to the first value. The PSAP 102 may be further configured to determine the confidence level associated with the detected stationary and/or slow-moving obstacle from the received MSD. The PSAP 102 may be configured to compare the determined count of the vehicles, for which the MSD corresponds to the first value, with a first threshold value. The first threshold value may be a statistically significant number, such as "100" vehicles. In instances when a significantly large number of vehicles, such as "110" vehicles, where "110" vehicles is greater than the first threshold value, are detected as slow-moving at a certain location, then probability of a traffic disturbance or a collision in the location may be high. In such a case, the PSAP 102 may be configured to generate an alert that may correspond to a preventive indication to avoid an accident. The alert may be indicative of an imminent threat situation, such as a collision or an accident, of one or more other vehicles in the vicinity that may be in motion towards the detected one or more stationary and/or slow-moving obstacles. The alert may be further indicative of an imminent threat situation, such as a collision or an accident, of one or more other vehicles in the vicinity that may be in motion towards the detected road conditions and/or traffic conditions. The road conditions may correspond to potholes and/or a broken down vehicle on the path. The traffic conditions may correspond to a number of vehicles at a location on the path at a certain date and time. In instances when a limited number of vehicles, such as "10" vehicles, where "10" vehicles is lower than the first threshold value, are detected as slow-moving at a certain location, then probability of a traffic disturbance or a collision in the location may be low.

In accordance with an embodiment, the PSAP 102 may be configured to determine a location and a direction of motion of each of the set of vehicles 106, for which the data field of the MSD corresponds to the second value. The PSAP 102 may be further configured to determine the confidence level associated with the one or more motion and/or vehicle parameters of each of the one or more vehicles. In accordance with an embodiment, the PSAP 102 may be configured to compare the determined count of the vehicles, for which the data field of the MSD corresponds to the second value within a second threshold value. In accordance with an embodiment, when the count of the one or more such vehicles exceeds the second threshold value, the PSAP 102 may be configured to generate an alert. The alert may be indicative of a potential threat of a collision or an accident of one or more other vehicles in the vicinity that may be in motion towards the determined location of the one or more vehicles. The alert may be further indicative of a potential threat situation, such as a collision or an accident, of one or more other vehicles in the vicinity that may be in motion towards the detected road conditions and/or traffic conditions of the path.

In accordance with an embodiment, the PSAP 102 may be configured to determine the first threshold value and/or the second threshold value based on a location. In accordance with an embodiment, the PSAP 102 may be configured to determine the first threshold value and/or the second threshold value based on the confidence level. The PSAP 102 may be configured to determine the confidence level based on a type or characteristics of the sensing device in each of the one or more vehicles. The type of the sensing device may comprise one or more of a model name of the ADAS system, a model name of a module of the sensing device, a type of sensing technique used by the sensing device to detect obstacles, a camera, a radio detection and ranging (RADAR), and/or a light detection and ranging (LIDAR). In an instance, the characteristics of the sensing device may comprise one or more of a resolution, a frame rate, and/or a sensitivity of the sensing device. The confidence level may be derived from the received MSD. Based on the determined confidence level, the PSAP 102 may be further configured to dynamically adjust the first threshold value and/or the second threshold value for the location.

In accordance with an embodiment, the PSAP 102 may be configured to transmit the generated alert to the TMC 104. In accordance with an embodiment, the TMC 104 may be communicatively coupled with one or more instances of the PSAP 102. In accordance with an embodiment, the TMC 104 may be integrated with the PSAP 102. The transmitted alert may comprise a reliability index that may be indicative of an accuracy of predicted likelihood of a potential collision at the determined location and the direction of motion of the one or more vehicles. In accordance with an embodiment, the TMC 104 may comprise an operator 104a that may manually trigger the broadcast of the received alert to the one or more other vehicles, via the communication network 108. In such a case, the communication network 108 may be a radio broadcasting infrastructure to vehicle (I2V) communication, such as dedicated short-range communication (DSRC). In accordance with an embodiment, the TMC 104 may automatically trigger the broadcast of the received alert to the one or more other vehicles. In accordance with an embodiment, the PSAP 102 may be further configured to transmit one or more signals to the TMC 104 to deactivate the broadcast of the generated alert. The deactivation of the broadcast of the generated alert may occur automatically or via manual intervention by the operator 104a. In accordance with an embodiment, the TMC 104 may be configured to transmit a notification to notify the one or more other vehicles that the threat situation has cleared.

The broadcasted alert may be one or more of audio-visual information, haptic information, audio information, voice-based broadcast message, text-based broadcast message, or activation of an alarm installed in the one or more other vehicles. The various components and systems in the one or more other vehicles may be configured to render the received alert by use of a display device, a dashboard indication, a steering wheel of the vehicle, a microphone and/or an audio system of the vehicle.

Figure 2:
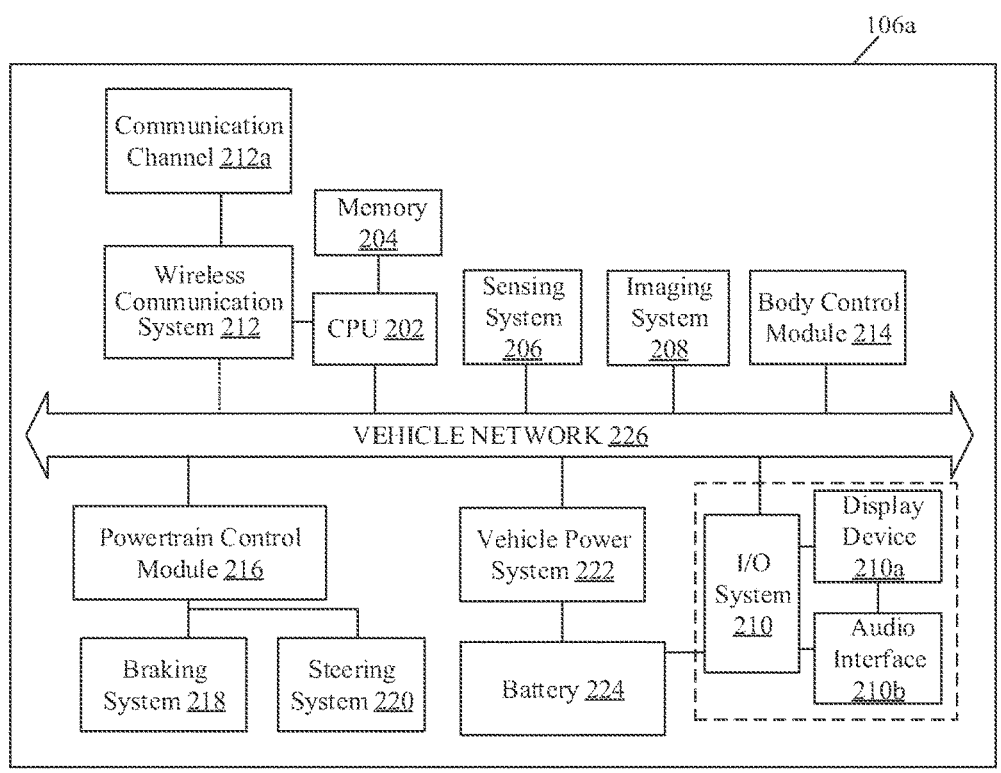
FIG. 2 is a block diagram that illustrates various exemplary components and systems of an exemplary vehicle for generation of a preventive alert, in accordance with an embodiment of the disclosure.

FIG. 2 is a block diagram that illustrates various exemplary components and systems of an exemplary vehicle for generation of a preventive alert, in accordance with an embodiment of the disclosure. FIG. 2 is explained in conjunction with elements from FIG. 1. With reference to FIG. 2, there is shown a vehicle of the set of vehicles 106, such as the vehicle 106a. The vehicle 106a may comprise the CPU 202 that may include a memory 204. The vehicle 106a may further comprise a sensing system 206, an imaging system 208, input/output (I/O) system 210, a wireless communication system 212, a body control module 214, and/or a powertrain control module 216. The powertrain control module 216 may include a braking system 218 and/or a steering system 220. The vehicle 106a may further comprise a vehicle power system 222 that may include a battery 224. The I/O system 210 may include display device 210a and an audio interface 210b. The wireless communication system 212 may include a communication channel 212a.

The various components and systems may be communicatively coupled via a vehicle network 226. The CPU 202 may be communicatively coupled to the memory 204, the sensing system 206, the imaging system 208, the I/O system 210, the wireless communication system 212, the body control module 214, the powertrain control module 216, and/or the vehicle power system 222, via the vehicle network 226. The wireless communication system 212 may be configured to communicate with the PSAP 102 and/or the TMC 104, via the communication network 108. It should be understood that the vehicle 106a may also include other suitable components and systems, but for the sake of brevity, those components and systems which are used to describe and explain the function and operation of the present disclosure are illustrated herein.

The CPU 202 may comprise suitable logic, circuitry, interfaces, and/or code that may be configured to execute a set of instructions stored in the memory 204. The CPU 202 may be implemented, based on a number of processor technologies known in the art. Examples of the CPU 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be configured to store the one or more algorithms for generation of a preventive alert. The memory 204 may be further configured to store a machine code and/or a computer program with at least one code section executable by the CPU 202. The memory 204 may further be configured to store correspondence information of a type of a sensing device in the sensing system 206. The memory 204 may be configured to store vehicle identification information that corresponds to the vehicle of the set of vehicles 106, such as the vehicles 106a, 106b, and/or 106c. The memory 204 may be configured to store a map that may correspond to the route of the road on which the vehicle travels. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), and/or a Secure Digital (SD) card.

The sensing system 206 may comprise suitable logic, circuitry, and/or interfaces that may be configured to detect one or more stationary and/or slow-moving obstacles on a road. The sensing system 206 may be further configured to detect a change in one or more motion and/or vehicle parameters associated with the vehicle. The sensing system 206 may be further configured to transmit the detected information to the one or more stationary and/or slow-moving obstacles, and the one or more motion and/or vehicle parameters to the CPU 202. Examples of the sensors used in the sensing system 206 may include, but are not limited to, an accelerometer, a gyro sensor, a proximity sensor, a Global Positioning System (GPS) sensor, the vehicle speed sensor, the odometric sensors, a yaw rate sensor, a steering angle detection sensor, a vehicle travel direction detection sensor, an image sensor, a touch sensor, and/or an infrared sensor.

The imaging system 208 may comprise suitable logic, circuitry, and/or interfaces that may be configured to be controlled by the CPU 202. The imaging system 208 may be configured to receive one or more instructions from the CPU 202 and/or a user, such as the driver of the vehicle. The imaging system 208 may be configured to capture one or more images and transmit the captured one or more images to the I/O system 210 for display. In accordance with an implementation, the imaging device may correspond to a camera that may be mounted on the body of the vehicle 106a. In accordance with an implementation, the imaging device may correspond to a camera that may be integrated in the body of the vehicle 106a. Example of the imaging device of the imaging system 208 may include, but are not limited to, a dedicated front focus camera, an outside rear view mirror (ORVM) camera, a motion camera, an image sensor, a radio detection and ranging (RADAR) unit coupled with a camera, a light detection and ranging (LIDAR) unit coupled with a camera.

The I/O system 210 may comprise various input and output devices that may be configured to communicate with the CPU 202. The I/O system 210 may be configured to render the one or more images captured by the imaging system 208, via the display device 210a. The display device 210a may refer to a touch screen that may be operable to render the one or more images, captured by the imaging system 208. Examples of the display device 210a may include, but are not limited a heads up display (HUD), an augmented reality heads up display (AR-HUD), a driver information console (DIC), a see-through display, a projection-based display, a smart-glass display, and/or an electrochromic display. The I/O system 210 may be further configured to render the received alert from the PSAP 102 or the TMC 104, via the audio interface 210b. The audio interface 210b may refer to a speaker, chime, buzzer, or other device to generate sound. The audio interface 210b may also refer to a microphone or other device to receive a voice input from an occupant of the vehicle 106a. The audio interface 210b may refer to a speaker, chime, buzzer, or other device to generate sound. The audio interface 210b may also refer to a microphone or other device to receive a voice input from an occupant of the vehicle 106a, such as the driver of the vehicle 106a.

The wireless communication system 212 may comprise suitable logic, circuitry, interfaces, and/or code that may be operable to communicate with the PSAP 102 and/or the TMC 104, via the communication channel 212a. The wireless communication system 212 may include, but is not limited to, an antenna, a telematics unit, a radio frequency (RF) transceiver, one or more amplifiers, one or more oscillators, a digital signal processor, a near field communication (NFC) circuitry, a coder-decoder (CODEC) chipset, and/or a subscriber identity module (SIM) card. The communication channel 212a may include a medium through which the wireless communication system 212 of the vehicle 106a may communicate with the PSAP 102 and/or the TMC 104. Further, the communication channel 212a may correspond to the communication network 108. Examples of the communication channel 212a may include, but are not limited to, a cellular network, such as a long-term evolution (LTE) network, a Wireless Fidelity (Wi-Fi) network, a Wireless Local Area Network (WLAN), the Internet, a dedicated short-range communication (DSRC) network, a mobile ad-hoc network (MANET), a vehicular ad-hoc network (VANET), and/or a Metropolitan Area Network (MAN). Examples of the second communication protocol, such as a wireless communication protocol, may include but are not limited to cellular communication protocols, such as Long-term Evolution (LTE), a wireless fidelity (Wi-Fi) protocol, a DSRC protocol, IEEE 802.11, 802.11p, 802.15, 802.16, 1609, Worldwide Interoperability for Microwave Access (Wi-MAX), Wireless Access in Vehicular Environments (WAVE), Transmission Control Protocol and Internet Protocol (TCP/IP), User Datagram Protocol (UDP), Hypertext Transfer Protocol (HTTP), ZigBee, EDGE, and/or Bluetooth (BT) communication protocols.

The body control module 214 may refer to another electronic control unit that suitable logic, circuitry, interfaces, and/or code that may be operable to control various electronic components or systems of the vehicle 106a, such as a central door locking system. The body control module 214 may be configured to receive a command from the CPU 202 to unlock a vehicle door of the vehicle 106a. The body control module 214 may relay the command to other suitable vehicle systems or components, such as the central door locking system for access control of the vehicle 106a.

The powertrain control module 216 may refer to an onboard computer of the vehicle 106a that may be configured to control an operation of an engine and a transmission system of the vehicle 106a. The powertrain control module 216 may be configured to control the engine's ignition, fuel injection, emission systems, and/or movement of a steering wheel associated with the steering system 220. The powertrain control module 216 may be further configured to control the operations of a transmission system (such as automatic transmission system) and the braking system 218.

The braking system 218 may refer to a system used to stop the vehicle 106a by application of frictional forces. The braking system 218 may be configured to receive a command from the body control module 214 or the CPU 202 based on the generated alert received from the PSAP 102.

The steering system 220 may be associated with the powertrain control module 216. The steering system 220 may include a steering wheel and/or an electric motor (provided for a power-assisted steering) that may be used by a vehicle user, to control movement of the vehicle 106a. Examples of the steering system 220 may include, but are not limited to, an autonomous steering control, a power-assisted steering system, a vacuum/hydraulic-based steering system, an electro-hydraulic power-assisted system (EH-PAS), or a "steer-by-wire" system, known in the art.

The vehicle power system 222 may be configured to regulate the charging and the power output of the battery 224 to various electric circuits and loads (not shown) of the vehicle 106a, as described above. When the vehicle 106a corresponds to a hybrid vehicle or an autonomous vehicle, the vehicle power system 222 may be configured to provide the required voltage to all of the components of the vehicle 106a. Further, the vehicle power system 222 may be configured to control the utilization of the battery power of the battery 224 for a specific amount of time. In accordance with an implementation, the vehicle power system 222 may correspond to a power electronics system, and may include a microcontroller that may be communicatively coupled to the vehicle network 226. In such an implementation, the microcontroller may be configured to receive one or more commands from the powertrain control module 216 under the control of the CPU 202.

The battery 224 may be a source of electric power for one or more electric circuits or loads of the vehicle 106a. The battery 224 may be a rechargeable battery. The battery 224 may be a source of electrical power to start an engine of the vehicle 106a by selectively providing electric power to an ignition system (not shown) of the vehicle 106a. The loads may include, but are not limited to various lights, such as headlights and interior cabin lights, electrically powered adjustable components, such as vehicle seats, mirrors, windows or the like, and/or other systems, such as radio, display device 210a, audio interface 210b.

The vehicle network 226 may include a medium through which the various control units, components, or systems of the vehicle 106a of the set of vehicles 106 may communicate with each other. In accordance with an implementation, vehicle communication of audio/video data for multimedia components may occur by use of Media Oriented Systems Transport (MOST) multimedia network protocol of the vehicle network 226. One or more communication interfaces, such as the CAN interface, a Local Interconnect Network (LIN) interface, may be used by the various components or systems of the vehicle 106a to connect to the vehicle network 226. In an implementation, the MOST multimedia network protocol and CAN interface may be implemented simultaneously in the vehicle 106a. The various control units, components, or systems of the vehicle 106a, may use various wired and wireless communication protocols, such as controller area network (CAN), Local Interconnect Network (LIN), Ethernet or other communication protocols to connect to the vehicle network 226. Examples of the wired and wireless communication protocols for the vehicle network 226 may include, but are not limited to, a vehicle area network (VAN), a CAN bus, Domestic Digital Bus (D2B), Time-Triggered Protocol (TTP), FlexRay, IEEE 1394, Carrier Sense Group of Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Powerline communication (PLC), and/or Serial Peripheral Interface (SPI) bus.

In operation, the CPU 202 of one or more vehicles that correspond to the set of vehicles 106 may be configured to establish a communicative connection with the PSAP 102 when the one or more vehicles are in a powered ON state. The communicative connection may be facilitated by the wireless communication system 212, based on the communication channel 212a. In accordance with such an embodiment, the vehicle 106a of the set of vehicles 106 may correspond to the ADAS. In accordance with an embodiment, one or more vehicles, such as the vehicles 106a, 106b, and/or 106c, from the set of vehicles may be equipped with the ADAS.

In accordance with an embodiment, the sensing devices of the sensing system 206 of the one or more vehicles may be configured to detect a change in one or more motion and/or vehicle parameters. The sensing system 206 may be configured to transmit the data of the detected one or more motion and/or vehicle parameters to the CPU 202, via the communication channel 212a. The CPU 202 may be configured to update one or more fields of a minimum set of data (MSD) that comprises details of the change in one or more motion and/or vehicle parameters, and/or the type of sensing devices of the sensing system 206. In accordance with an embodiment, the CPU 202 may be configured to retrieve a confidence level from the memory 204, based on the type of the sensing devices of the sensing system 206 that detected the change in one or more motion and/or vehicle parameters. Based on the retrieved confidence level, the CPU 202 may be further configured to update one of the data fields of the MSD with the retrieved confidence level. The confidence level may vary based on a type of the sensing devices of the sensing system 206. For example, the confidence level for sensors based on visual stimulus, such as camera, may be higher than the sensors based on physical stimulus, such as a change in speed.

In accordance with an embodiment, the imaging device of the imaging system 208 of the one or more vehicles may be configured to detect one or more stationary and/or slow-moving obstacles. In accordance with an embodiment, the imaging device of the imaging system 208 of the one or more vehicles may be configured to detect one or more stationary and/or slow-moving obstacles in conjunction with a motion camera, a dedicated radio detection and ranging (RADAR) equipment coupled with a camera, a dedicated Light Detection and Ranging (LIDAR) equipment installed in the vehicles. The imaging system 208 may be configured to transmit the data of the detected one or more stationary and/or slow-moving obstacles to the CPU 202, via the communication channel 212a. The CPU 202 may be configured to update one or more fields of the MSD that comprises the details of the detected one or more stationary and/or slow-moving obstacles. The CPU 202 may be further configured to transmit the updated MSD to the PSAP 102, via the communication channel 212a. Based on the received MSD, the PSAP 102 may be configured to generate an alert that may correspond to a preventive indication to avoid an emergency situation, such as a road accident. In accordance with an embodiment, the imaging system 208 may comprise one or more imaging devices that may be mounted on or integrated into the body of the vehicle 106a.

Examples of the vehicle parameters include, but are not limited to, a direction of travel, lane information, a vehicle type, a vehicle identification number, a vehicle propulsion storage type, a geospatial position, a previous location, a number of passengers, a status of hazard indicator, a status of turn signal indicator, a status of lane change indicator, a steering angle, and/or a yaw rate. Examples of the motion parameters may include a speed and/or a rate of change of speed of the one or more vehicles, climate information, brightness level information of environment outside the one or more vehicles along the path, and/or a type or characteristics of a sensor that generates the sensor data of the one or more vehicles and/or detects the stationary and/or slow-moving obstacle.

In accordance with another aspect of the disclosure, the CPU 202 of the one or more vehicles, such as the vehicle 106a, may be configured to receive an alert from the PSAP 102, via the communication channel 212a. In such a case, alert may be generated by the PSAP 102 based on the MSD received from another vehicle. The one or more vehicles may be in motion towards location of the other vehicle that may transmit the MSD to the PSAP 102. In such a case, the CPU 202 of the one or more vehicles may be configured to receive the alert directly from the PSAP 102, via the communication channel 212a. Notwithstanding, the disclosure may not be so limited, and the CPU 202 of the one or more vehicles may be configured to receive the alert from one or more other vehicles, via Vehicle to Vehicle (V2V) communication established between wireless communication system 212 of the one or more other vehicles, without limiting the scope of the disclosure. The received alert may indicate a threat of a collision at a location that may be present in the vicinity and direction of motion of the one or more other vehicles. The received alert may further comprise a reliability index that may be indicative of an accuracy of predicted likelihood of a potential collision at a determined location and a direction of motion of the other vehicles. Examples of the received alert may be one or more of visual information, haptic information, audio information, a voice-based broadcast message, a text-based broadcast message, and an activation of an alarm installed in the one or more other vehicles.

In accordance with an embodiment, I/O system 210 of the vehicle 106a of the one or more vehicles may be configured to control the display of the alert when the broadcasted alert corresponds to visual information and/or a text-based broadcast message. The received alert may be displayed on the display device 210a that may comprise one or more of a heads-up display (HUD), an augmented reality (AR)-HUD, a driver information console (DIC), a see-through display, or a smart-glass display. In accordance with an embodiment, when the received alert corresponds to haptic information, the steering system 220 of the vehicle 106a of the one or more vehicles may be configured to vibrate a steering wheel of the vehicle 106a. In accordance with an embodiment, when the received alert corresponds to audio information and/or a voice-based broadcast message, the I/O system 210 of the vehicle 106a of the one or more vehicles may be configured to render the received alert on a microphone and/or an audio system of the one or more vehicles, via the audio interface 210b. In accordance with an embodiment, the vehicle power system 222 may be configured to control the power supply from the battery 224 to the I/O system 210. Based on the power supply from the battery 224, the operational state of the display device 210a and/or the audio interface 210b may be switched from "ON" to "OFF" state, and vice versa.

In accordance with an embodiment, based on the received alert, the powertrain control module 216 of the vehicle 106a may configure the braking system 218 to apply brakes on the wheels of the one or more vehicles. In accordance with an embodiment, when the received alert is generated based on an emergency situation, such as deployment of airbags of the one or more vehicles, the CPU 202 may be configured to transmit a signal to the body control module 214 to unlock the doors of the one or more vehicles. Further, in such situation, the powertrain control module 216 of the one or more vehicles may be configured to control one or more parameters of the steering system 220 to control a direction of motion of the one or more vehicles, based on the control of an electric motor associated with the steering wheel of the vehicle 106a. Such one or more parameters may comprise a degree of rotation of the steering wheel.

Figure 3:
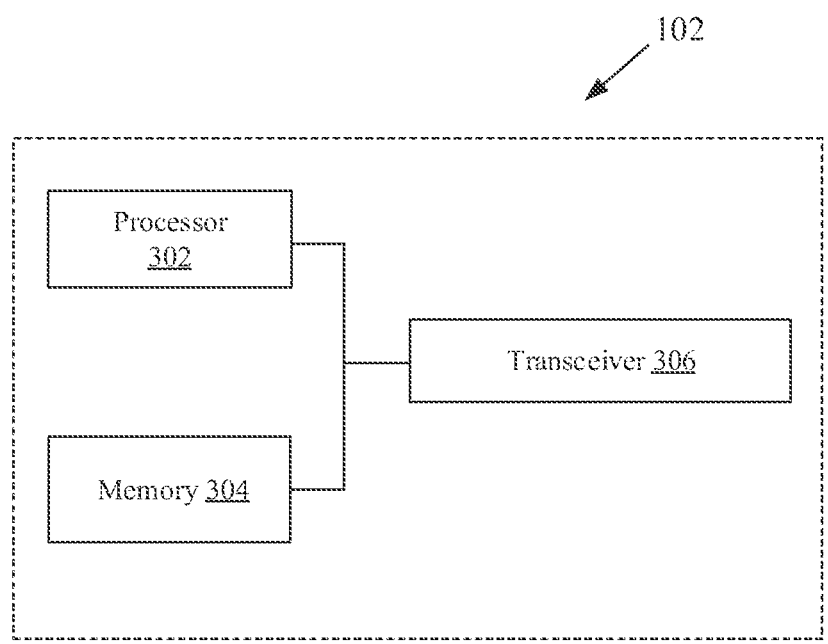
FIG. 3 is a block diagram that illustrates various exemplary components and systems for generation of a preventive alert, in accordance with an embodiment of the disclosure.

FIG. 3 is a block diagram that illustrates an exemplary PSAP server for generation of a preventive alert, in accordance with an embodiment of the disclosure. FIG. 3 is explained in conjunction with elements from FIG. 1. With reference to FIG. 3, the PSAP 102 may comprise one or more circuits, such as a processor 302, a memory 304, and a transceiver 306.

The processor 302 may comprise suitable logic, circuitry, interfaces, and/or code that may be configured to execute a set of instructions stored in the memory 304. The processor 302 may be implemented, based on a number of processor technologies known in the art. Examples of the processor 302 may be an X86-based processor, a Reduced Instruction Set Computing (RISC) processor, an Application-Specific Integrated Circuit (ASIC) processor, a Complex Instruction Set Computing (CISC) processor, a microcontroller, a graphics processing unit (GPU), a state machine, and/or other processors or circuits.

The memory 304 may comprise suitable logic, circuitry, and/or interfaces that may be configured to store the one or more algorithms for generation of a preventive alert. The memory 304 may be further configured to store a machine code and/or a set of instructions executable by the processor 302. The memory 304 may be configured to store vehicle identification information that corresponds to each vehicle of the set of vehicles 106. The memory 304 may further be configured to store correspondence information for a type of sensing device and a confidence level. The memory 304 may be further configured to store a map that may correspond to the route of the road on which the set of vehicles 106 travel. Examples of implementation of the memory 304 may include, but are not limited to, Random Access Memory (RAM), Electrically Erasable Programmable Read-Only Memory (EEPROM), Read Only Memory (ROM), Hard Disk Drive (HDD), and/or a Secure Digital (SD) card.

The transceiver 306 may comprise suitable logic, circuitry, interfaces, and/or code that may be configured to communicate with one or more external network elements, such as the set of vehicles 106 and/or the TMC 104. Such communication with the one or more external network elements may occur by use of the communication network 108. The transceiver 306 may implement known technologies to support wireless communication of the PSAP 102 with the communication network 108. The transceiver 306 may include, but is not limited to, an antenna, a radio frequency (RF) transceiver, one or more amplifiers, one or more oscillators, a digital signal processor, a coder-decoder (CODEC) chipset, and/or a subscriber identity module (SIM) card.

The transceiver 306 may communicate via wireless communication with networks, such as the communication network 108. The wireless communication may use one or more of a plurality of communication standards, protocols and technologies, as described above for the communication channel 212a of the wireless communication.

In operation, the processor 302 may be configured to receive an MSD from the various components and systems of one or more vehicles that correspond to the set of vehicles 106, such as the vehicles 106a, 106b, and/or 106c. The MSD may be received via the transceiver 306. The format of the MSD may correspond to the MSD used in an eCall (3GPP TS 22.101, "Service aspects; Service principles" and 3GPP TS 26.967, "eCall Data Transfer, In-band modem solution"), known in the art.

In accordance with an embodiment, the MSD may comprise a field for a first value and/or a second value. In accordance with an embodiment, the data field in the MSD may be updated with the first value when the MSD corresponds to vehicles that may or may not be equipped with the ADAS. The field in the MSD that may be updated with the second value when the MSD corresponds to vehicles that may not be equipped with the ADAS. In accordance with an embodiment, the data field that corresponds to the first value may be updated with other values to indicate a type of one or more stationary and/or slow-moving obstacles. In accordance with an embodiment, the data field that corresponds to the second value may be updated with other values to indicate the type of one or more motion and/or vehicle parameters, which may change.

The other values may further indicate danger level information of the one or more stationary and/or slow-moving obstacles. Such danger level information may comprise a predicted likelihood for a collision of the one or more stationary and/or slow-moving obstacles with the one or more vehicles. The predicted likelihood for a collision may be based on the physical characteristics of the one or more stationary and/or slow-moving obstacles, such as a size greater or smaller than a pre-defined threshold. The physical characteristics may further include a type of detected one or more stationary and/or slow-moving obstacles, such as a vehicle, a truck, a pedestrian, a cyclist or a motorcyclist. The physical characteristics may further include an orientation with respect to a path, and/or a speed of motion of the one or more stationary and/or slow-moving obstacles with respect to the one or more vehicles. The predicted likelihood for a collision may be based on one or more characteristics of the road, such as a blind spot or a curve, or a type of a road. The type of the road may include, but is not limited to, a service road, a highway, and/or the like. The predicted likelihood for a collision may be further based brightness level information of environment outside the one or more vehicles along the path.

In accordance with an embodiment, the other fields of the MSD may correspond to motion parameters, such as speed and/or acceleration, one or more vehicle parameters, such as a direction of travel, lane information, a vehicle type, a vehicle identification number, a vehicle propulsion storage type.

In accordance with an embodiment, the processor 302 may be configured to receive the MSD from the various components and systems of the one or more vehicles from the set of vehicles 106 that may be equipped with ADAS, via the transceiver 306. The received MSD may comprise data that may correspond to one or more detected stationary and/or slow-moving obstacles. The received MSD may comprise data that may correspond to the detected road conditions and/or traffic conditions on the path. The detected one or more stationary and/or slow-moving obstacles may correspond to a stationary obstacle, an animal, a tree, a landslide, and/or another stationary vehicle present on a road. Notwithstanding, the disclosure may not be so limited, and the detected one or more stationary and/or slow-moving obstacles may correspond to one or more other stationary and/or slow-moving obstacles, without limiting the scope of the disclosure.

In accordance with an embodiment, the processor 302 may be configured to receive the MSD from the various components and systems of the one or more vehicles from the set of vehicles 106 that may not be equipped with ADAS, via the transceiver 306. The received MSD may comprise data that corresponds to a change in one or more motion and/or vehicle parameters of the one or more vehicles. In accordance with an embodiment, the MSD may further comprise a type of a sensing device associated with the one or more vehicles that detects one or more stationary and/or slow-moving obstacles.

The processor 302 may be configured to retrieve a confidence level associated with the sensing device from the memory 304, when the received MSD comprises the type of sensing device, such as a speed sensor, direction sensor, and/or the one or more imaging devices. In accordance with an embodiment, the MSD may comprise a confidence level associated with the sensing devices of the one or more vehicles. The confidence level may be indicative of the reliability of a detected stationary and/or slow-moving obstacle. The confidence level may be further indicative of the reliability of the detected change in one or more motion and/or vehicle parameters.

In accordance with an embodiment, the processor 302 may be configured to determine a count of the one or more vehicles based on the received MSD from each of the one or more vehicles. The processor 302 may further be able to determine the first value and/or the second value from the received MSD from each of the one or more vehicles. In accordance with an embodiment, the processor 302 may be configured to dynamically determine a set of threshold values based on the confidence level that corresponds to the one or more vehicles. The dynamically determined set of threshold values may correspond to a location and/or a portion of a road on which the one or more vehicles may be in motion. In accordance with an embodiment, the determination of the set of threshold values may be based on a traffic condition associated with the portion of the road. In accordance with an embodiment, the determination of the set of threshold values may be based on manual input provided by an operator located at the PSAP 102.

In accordance with an embodiment, the set of threshold values may include, but are not limited to, a first threshold value, a second threshold value, a third threshold value, and/or a fourth threshold value. In accordance with an embodiment, the first threshold value may correspond to the first value present in the received MSD. The second threshold value, the third threshold value, and/or the fourth threshold values may correspond to the second value present in the received MSD.

In accordance with an embodiment, the processor 302 may be further configured to determine one or more motion and/or vehicle parameters from the MSD for each vehicle of the one or more vehicles. Based on the determined one or more motion and/or vehicle parameters, the processor 302 may be further configured to determine a location and a direction of motion of each of the one or more vehicles.

In accordance with an embodiment, when the count of the one or more vehicles exceeds the first threshold value, the processor 302 may be configured to generate an alert. The generated alert may be indicative of an imminent threat situation, such as a collision of one or more other vehicles that approach the one or more vehicles, at the determined location and the direction of motion of the one or more vehicles. In accordance with an embodiment, when the count of the one or more vehicles exceeds the second threshold value, the processor 302 may be configured to determine a speed of the one or more vehicles from the received MSD. The processor 302 may be further configured to retrieve a speed threshold value from the memory 304. When the determined speed of the one or more vehicles is less than retrieved speed threshold value, the processor 302 may be configured to generate an alert. The generated alert may be indicative of a potential threat situation, such as a collision of the one or more other vehicles that approach the one or more vehicles, at the determined location and the direction of motion of the one or more vehicles.

In accordance with an embodiment, when the count of the one or more vehicles exceeds the third threshold value, the processor 302 may be configured to determine a time period for which the hazard indicators of the one or more vehicles are switched ON, from the received MSD. The processor 302 may be further configured to retrieve a time period threshold value from the memory 304. When the determined time period for which the hazard indicators of the one or more vehicles are switched ON exceeds the retrieved time period threshold value, the processor 302 may be configured to generate an alert. The generated alert may be indicative of a potential threat situation, such as a collision of the one or more other vehicles that approach the one or more vehicles, at the determined location and the direction of motion of the one or more vehicles.

In accordance with an embodiment, when the count of the one or more vehicles exceeds the fourth threshold value, the processor 302 may be configured to determine operational states of the lane change indicators of the one or more vehicles, from the received MSD. The processor 302 may be configured to generate an alert, when the determined lane change indicators are switched to the ON operational state. The generated alert may be indicative of a potential threat situation, such as a collision of one or more other vehicles that approach the one or more vehicles, at the determined location and the direction of motion of the one or more vehicles.

In accordance with an embodiment, the processor 302 may be configured to generate an alert based on a comparison of the determined count of one or more vehicles with a combination of one or more of the first threshold value, the second threshold value, the third threshold value, and/or the fourth threshold value.

In accordance with an embodiment, the processor 302 may be configured to transmit the generated alert to the TMC 104, via the transceiver 306. In accordance with an embodiment, the processor 302 may be configured to broadcast the generated alert directly to the one or more other vehicles, via an Infrastructure to Vehicle (I2V) network. In accordance with an embodiment, when the generated alert is based on the second threshold value, third threshold value, and/or fourth threshold value, the processor 302 may be configured to include a reliability index with the generated alert. The reliability index may be indicative of an accuracy of predicted likelihood of a potential collision at the determined location and the direction of motion of the one or more vehicles. In accordance with an embodiment, the reliability index may be directly proportional to the confidence level. For example, an alert generated based on one or more motion and/or vehicle parameters detected by high confidence level sensing devices may correspond to a high reliability index.

In accordance with an embodiment, the processor 302 may be further configured to generate an alert deactivation signal to deactivate the broadcast of the generated alert. The generated alert deactivation signal may indicate that the imminent and/or the potential threat situation have cleared. The processor 302 may be configured to transmit the alert deactivation signal to the various components and systems of the one or more vehicles, via the transceiver 306. The alert deactivation signal may be generated when the determined count of one or more vehicles is lower than the first threshold value, the second threshold value, the third threshold value, and/or the fourth threshold value. The generated alert may be deactivated based on the generated alert deactivation signal. The generated alert and/or the alert deactivation signal may be encoded data, visual information, haptic information, audio information, voice-based broadcast message, text-based broadcast message, or activation of an alarm installed in the one or more other vehicles. In accordance with an embodiment, the processor 302 may be configured to transmit the alert deactivation signal to the TMC 104, via the transceiver 306. The TMC 104 may then transmit the alert deactivation signal to the various components and systems of the one or more vehicles.

Figure 4:
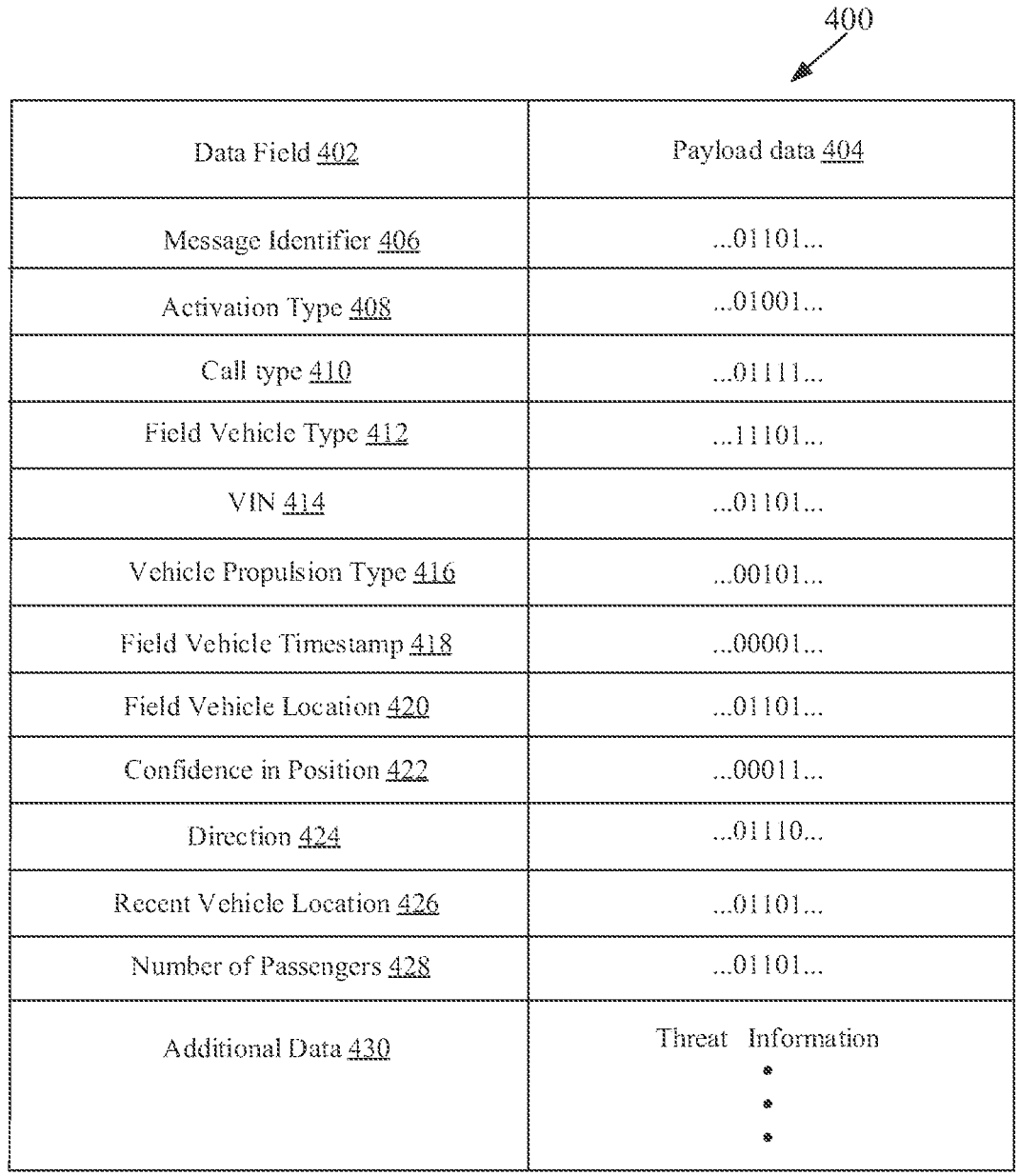
FIG. 4 is a data structure that illustrates an exemplary minimum set of data format for the disclosed system and method to generate a preventive alert, in accordance with an embodiment of the disclosure.

FIG. 4 is a data structure that illustrates an exemplary minimum set of data format for the disclosed system and method to generate a preventive alert, in accordance with an embodiment of the disclosure. FIG. 4 is explained in conjunction with elements from FIGS. 1 to 3.

With reference to FIG. 4, there is shown a minimum set of data (MSD) data structure 400 that may comprise a plurality of data fields 402. The MSD data structure 400 may further include payload data 404 for each of the plurality of data fields 402. The plurality of data fields 402 may include mandatory fields, such as message identifier 406, activation type 408, call type 410, field vehicle type 412, vehicle identification number (VIN) 414, vehicle propulsion type 416, vehicle timestamp 418, vehicle location 420, confidence in position 422, and direction 424. The plurality of data fields 402 may further include optional fields, such as recent vehicle location 426, number of passengers 428, and additional data 430. Each of the mandatory fields and optional fields in the plurality of fields 402 may be associated with a data value in the payload data 404. The data values in the payload data 404 may correspond to a predefined number of bytes allocated to corresponding mandatory fields and optional fields. The data values in the payload data 404 may correspond to a string value or an integer value.

In accordance with an exemplary scenario, the message identifier 406 may correspond to a version of the MSD data structure 400. The processor 302 and the CPU 202 may be typically configured to process a lower version of the MSD that may be received from the set of vehicles 106. However, the processor 302 and the CPU 202 may also process different versions of the MSD, such as a higher version of MSD based on the backward compatibility of the MSD. Typically, the message identifier 406 may be allocated one or more bits from the "140-byte" MSD.

The activation type 408 may indicate whether a communicative connection between the set of vehicles 106 and the PSAP 102 is established "automatically" or "manually". The call type 410 may indicate whether a communicative connection between the set of vehicles 106 and the PSAP 102 corresponds to an "emergency call" or a "test call".

The field vehicle type 412 may specify a type of the vehicle, such as the vehicles 106a, 106b, and/or 106c. The type of the vehicle may be one of a passenger vehicle, a bus, a coach, a light commercial vehicle, a heavy duty vehicle, and/or a motorcycle. The VIN 414 may specify a unique identification number of the vehicle. Further, the format of the payload data 404 for the VIN 414 may be based on a standard, such as "International Standard Organization (ISO) 3779:2009".

The vehicle propulsion type 416 may specify a type of a propulsion system used in the vehicle. The type of a propulsion system may include, but is not limited to, one or more of a gasoline tank, a diesel tank, a compressed natural gas (CNG) tank. The vehicle timestamp 418 may specify a time of an incident, such as detection of one or more stationary and/or slow-moving obstacles. The vehicle location 420 may specify latitude and/or longitude coordinates of the vehicle. The latitude and/or longitude coordinates of the vehicle may be recorded by the CPU 202 of the vehicle when the data fields of the MSD are updated. Further, the vehicle location 420 may comprise a last known location of the vehicle.

The confidence in position 422 may specify a level of confidence with respect to the latitude and/or longitude coordinates of the vehicle specified in the vehicle location 420. The data value in the payload data 404 of the confidence in position 422 may indicate a "low confidence in position" when the vehicle is not in a range of "150 meters" of the latitude and/or longitude coordinates of the vehicle reported in the vehicle location 420. The direction 424 may indicate a direction of motion of the vehicle. The indicated direction of motion may correspond to a carriageway and/or a lane at the reported latitude and/or longitude coordinates in which the vehicle may be in motion.

The recent vehicle location 426 may indicate the latitude and/or longitude coordinates of the previous two locations with respect to the reported latitude and/or longitude coordinates in the current vehicle location 420. The number of passengers 428 may indicate the number of passengers that may be present inside the vehicle.

The additional data 430 may indicate whether the threat of a collision or an accident detected by the vehicle is imminent or potential. In accordance with an embodiment, the first value in the payload data 404 for the additional data 430 may correspond to the value, "threat" when the imaging device 308 of the vehicle detects one or more stationary and/or slow-moving obstacles, road conditions, and/or traffic conditions on the path. In accordance with an embodiment, the second value in the payload data 404 for the additional data 430 may correspond to the value, "information" when the sensing system 206 of the vehicle detects a change in one or more motion and/or vehicle parameters, such as a sudden decrease of the speed of the vehicle that may be detected from the sensor device. A flag, "information", may be put as the additional data 430 at the vehicle and transmitted to the PSAP 102. In an instance, the additional data 430 may be updated with other values that may correspond to the first value or the second value.

In accordance with an embodiment, other values, such as danger level information and/or a confidence level information, may be included along with the value of "threat" or "information", in the field of additional data 430. The danger level and the confidence level are explained in the following description.

In accordance with an embodiment, the other values may indicate a type of one or more stationary and/or slow-moving obstacles when the CPU 202 updates the additional data 430 in the MSD with the value, "threat". In accordance with an embodiment, the other values may indicate a type of a change in one or more motion and/or vehicle parameters, when the CPU 202 updates the additional data 430 in the MSD with the value, "information".

In accordance with an embodiment, the other values may further comprise danger level information of the one or more stationary and/or slow-moving obstacles. Such danger level information may indicate a predicted likelihood for a collision of the one or more stationary and/or slow-moving obstacles with one or more vehicles at a location moving in a particular direction. The direction of movement of the stationary and/or the moving obstacle may be same as the one or more vehicles, or opposite to the direction of motion of the one or more vehicles.

In accordance with an embodiment, the additional data 430 may further be updated with the confidence level information determined by the CPU 202, based on a type of the sensing device that detects one or more stationary and/or slow-moving obstacles. In accordance with an embodiment, the additional data 430 may be updated with a reliability index that may be indicative of accuracy of predicted likelihood of a potential collision at the location and the direction of motion of the one or more vehicles. Notwithstanding, the disclosure may not be so limited, and the additional data 430 may comprise one or more other parameters that may be reported by the vehicle, without limiting the scope of the disclosure.

Figure 5A:
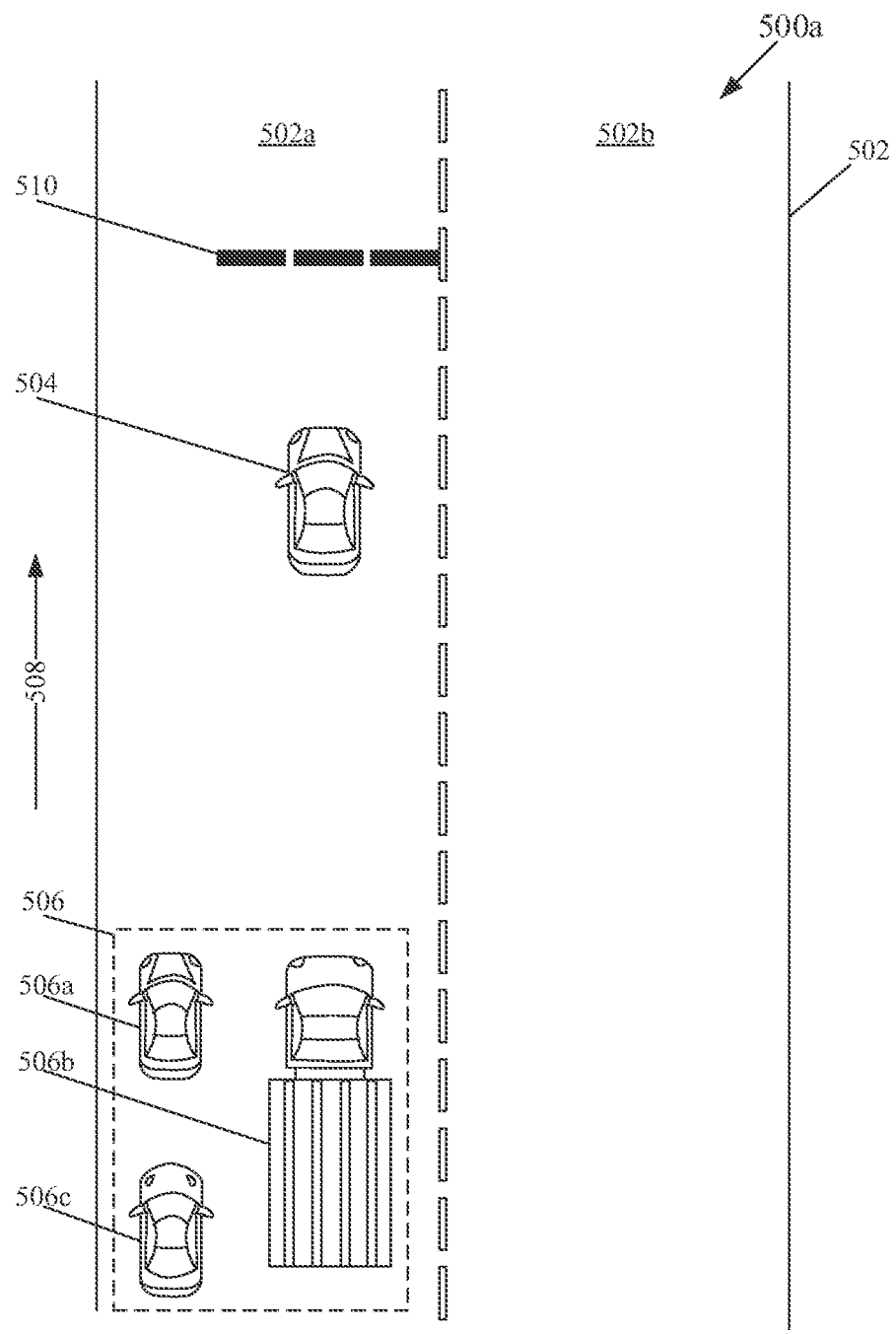
FIGS. 5A, 5B, and 5C illustrate exemplary scenarios for generation of a preventive alert by a server, in accordance with an embodiment of the disclosure.
Figure 5B:
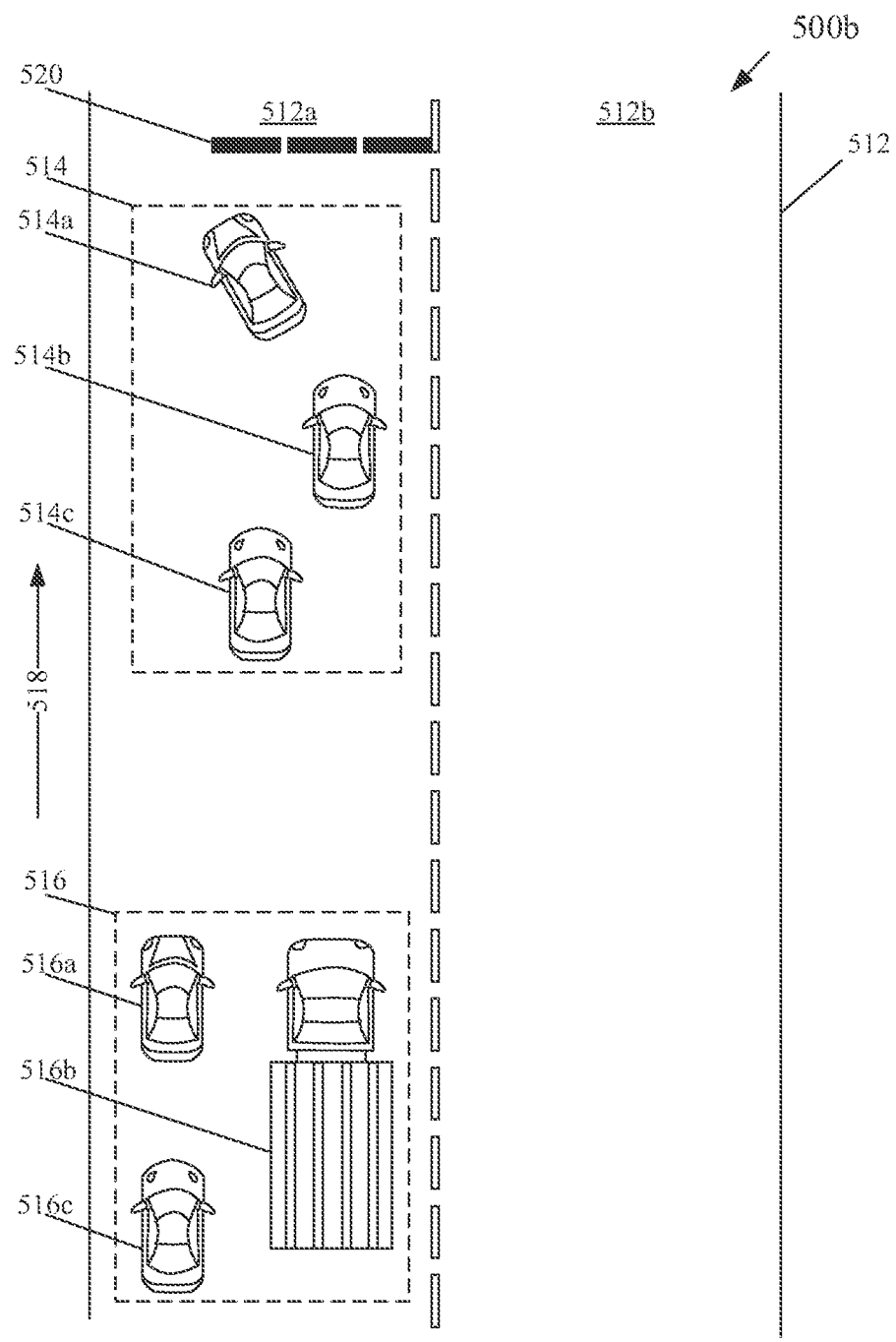
Figure 5C:
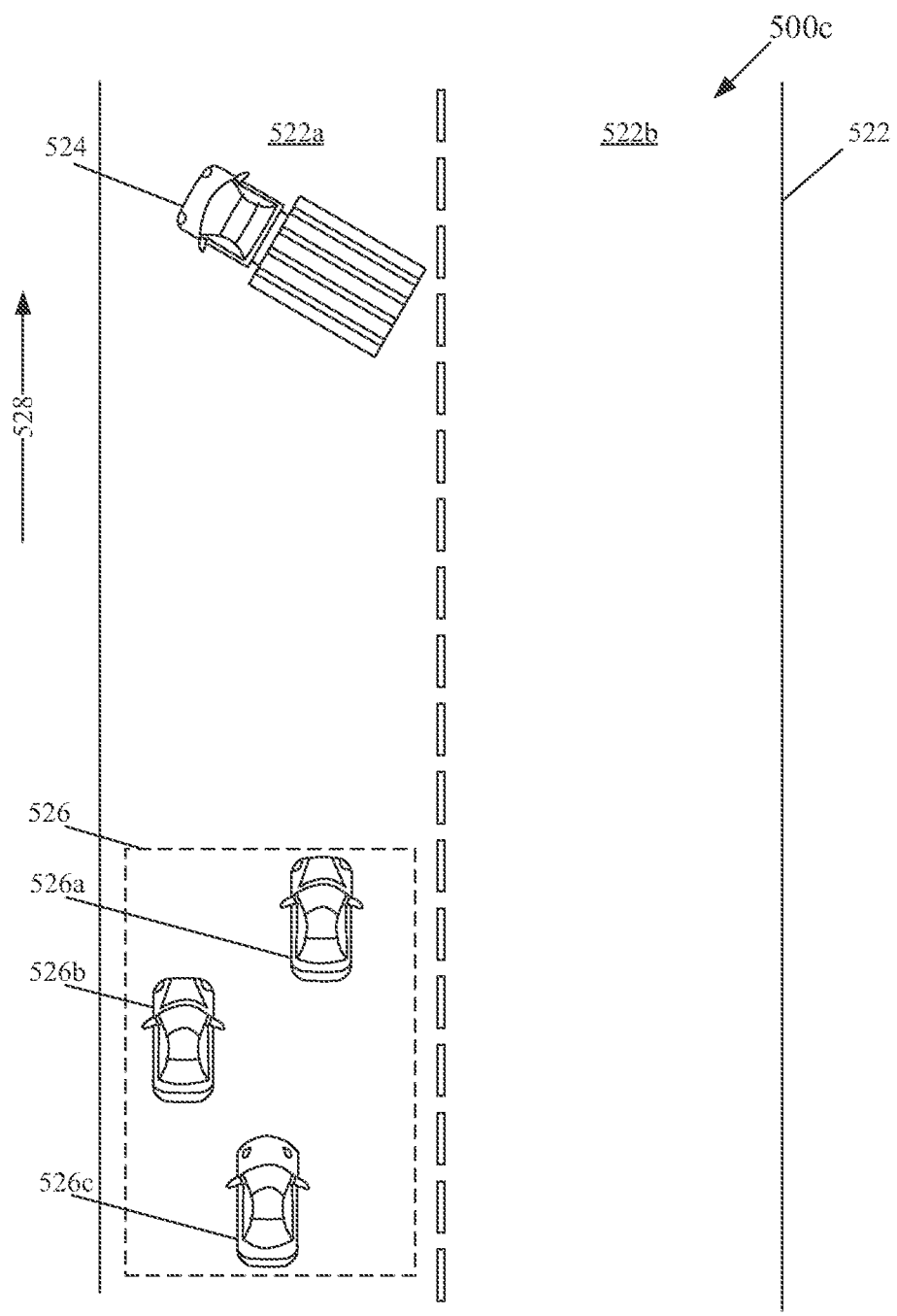

FIGS. 5A, 5B, and 5C illustrate exemplary scenarios for generation of a preventive alert by a server, in accordance with an embodiment of the disclosure. FIGS. 5A, 5B, and 5C are explained in conjunction with elements from FIGS. 1, 2, 3 and 4

With reference to FIG. 5A, there is shown a portion 500a of a road 502 that may comprise lanes 502a and 502b. A vehicle 504 and set of vehicles 506 that may be in motion on the road 502. The set of vehicles 506 may comprise vehicles 506a, 506b, and 506c. The vehicle 504 and the set of vehicles 506 may be in motion along the lane 502a, in the direction 508. There is further shown an obstacle 510, such as a boulder and/or a barricade, towards which the vehicle 504 and the set of vehicles 506 are in motion. The vehicle 504 and the set of vehicles 506 may correspond to the set of vehicles 106, as shown in FIG. 1. Further, various components and systems of the vehicle 504 and the set of vehicles 506 may correspond to that of the vehicle 106a, as shown in FIG. 3. The various components and systems of the vehicle 504 may generate a minimum set of data (MSD), the data structure of which may be similar to the MSD data structure 400, as shown in FIG. 4.

In accordance with a first scenario, the various components and systems of the vehicle 504 may be equipped with ADAS that may be configured to detect the presence of the obstacle 510. The vehicle 504 and the set of the vehicles 506 may be communicatively coupled with the PSAP 102 and/or the TMC 104. Based on the detected obstacle 510, the CPU that controls the various components and systems of the vehicle 504 may be configured to update the additional data of the MSD with the value, "threat". The CPU that controls the various components and systems of the vehicle 504 may be further configured to update the vehicle location and/or the direction in the MSD with the current location and direction of motion of the vehicle 504. The CPU that controls the various components and systems of the vehicle 504 may be further configured to update the other data fields of the MSD with the payload data that may correspond to the vehicle 504. The CPU that controls the various components and systems of the vehicle 504 may be further configured to transmit the updated MSD to the PSAP 102, via the communication network 108.

In accordance with the first scenario, the processor 302 in the PSAP 102 may be configured to determine the value, "threat" updated in the MSD. The processor 302 may further be configured to determine the data values in the payload data (from the MSD) that corresponds to the vehicle location and/or the direction of the vehicle 504. Based on the determined data values in the payload data, the processor 302 may be configured to determine that the updated value, "threat" in the MSD may indicate an imminent collision of the set of vehicles 506 with the obstacle 510. The processor 302 may be further configured to determine a count of the vehicles that include the vehicle 504 for which the updated value is, "threat" in the MSD. In instances, when the determined count of the vehicles exceeds a first threshold value, the processor 302 may be configured to generate an alert that may correspond to a preventive indication to avoid an emergency situation, such as a road accident. The generated alert may be transmitted to the TMC 104 via the communication network 108. The TMC 104 may broadcast the alert to the set of vehicles 506. The alert may correspond to the presence of the obstacle 510 at a reported location of the road 502 in the direction 508. In another instance, the processor 302 may directly communicate the generated alert to the set of vehicles 506, via the communication network 108. The CPU of each of the set of vehicles 506 may be configured to receive the generated alert. The I/O devices in the various components and systems of each of the set of vehicles 506 may be configured to render the received alert that may be useful for the drivers of each of the set of vehicles 506 to anticipate the obstacle 510.

With reference to FIG. 5B, there is shown a portion 500b of a road 512 that may comprise lanes 512a and 512b. A first set of vehicles 514 and a set second of vehicles 516 may be in motion on the road 512. The first set of vehicles 514 may comprise vehicles 514a, 514b, and 514c. The second set of vehicles 516 may comprise vehicles 516a, 516b, and 516c. The first set of vehicles 514 and the set second of vehicles 516 may be in motion along the lane 512a, in a direction 518. There is further shown an obstacle 520, such as a boulder and/or a barricade, towards which the first set of vehicles 514 and the second set of vehicles 516 are in motion. The first set of vehicles 514 and the second set of vehicles 516 may correspond to the set of vehicles 106, as shown in FIG. 1. Further, first set of vehicles 514 and the set of vehicles 516 may comprise various components and systems that may be similar to that of the vehicle 106a of the set of vehicles 106, as shown in FIG. 3. The first set of vehicles 514 may generate a minimum set of data (MSD), the data structure of which may be similar to the MSD data structure 400, as shown in FIG. 4.

In accordance with a second scenario, the various components and systems of the first set of vehicles 514 may not be equipped with ADAS. Each vehicle of the first set of vehicles 506 may include sensing devices, similar to the sensing devices of the sensing system 206, as shown in FIG. 3. The first set of vehicles 514 and the second set of the vehicles 516 may be communicatively coupled with the PSAP 102 and/or the TMC 104. The sensing devices of each of the first set of vehicles 514 may be configured to detect a change in one or more motion and/or vehicle parameters. For example, the sensing devices of the vehicle 514a may be configured to detect a change in the yaw rate of the vehicle 514a. The yaw rate of the vehicle 514a may be directed away from the obstacle 520, in order to avoid a collision. Similarly, an accelerometer from the sensing devices of the vehicle 514b may be configured to detect a change in the speed of the vehicle 514b, in order to avoid the collision with the obstacle 520.

Based on the detected obstacle and a change in one or more motion and/or vehicle parameters, the CPU of each of the first set of vehicles 514, may be configured to update the corresponding MSDs generated by each of the first set of vehicles 514. The data field, additional data, of each of the MSDs may be updated with the value, "information". The CPU that controls the various components and systems of each of the first set of vehicles 514 may be further configured to update the payload data of the data fields, vehicle location and/or the direction in the MSD, with the current location and direction of motion of a vehicle of the first set of vehicles 514.

In an instance, the CPU that controls the various components and systems of the vehicle 514a may be configured to update the payload data of the data fields in the corresponding MSD with information of operational state of hazard indicators of the vehicle 514a. In another instance, the CPU that controls the various components and systems of the vehicle 514b may be configured to update the payload data of the data fields in the corresponding MSD with the speed information of the vehicle 514b. In another instance, the CPU that controls the various components and systems of the vehicle 514c may be configured to update the payload data of the data fields in the corresponding MSD with information for operational state of lane change indicators of the vehicle 514c. The CPU that controls the various components and systems of each of the vehicles 514a, 514b, and 514c may be further configured to update the payload data of the other data fields in the corresponding MSDs generated by the vehicles 514a, 514b, and/or 514c. The CPU that controls the various components and systems of each of the vehicles 514a, 514b, and 514c may be further configured to update the corresponding MSDs with payload data that relates to confidence level. The confidence level may be associated with a type of sensing device that detects the change in one or more motion and/or vehicle parameters.

The CPU that controls the various components and systems of each of the vehicles 514a, 514b, and 514c may be further configured to transmit the corresponding updated MSDs to the PSAP 102, via the communication network 108.

In an instance, the processor 302 in the PSAP 102 may be configured to determine the data value, "information", in the data field additional data, of the updated MSDs received from each of the vehicles 514a, 514b, and 514c. The processor 302 may further be configured to determine a count of the vehicles for which the data value is "information" in the data field additional data, of the updated MSD. The processor 302 may be further configured to determine the data values in the payload data that corresponds to the data fields, such as vehicle location and/or direction, in the updated MSDs, received from each of the vehicles 514a, 514b, and/or 514c. Based on the determined count and data values in the payload data, the processor 302 may be configured to further determine whether the additional data of the received MSDs is updated with other information. Such other information may include, but is not limited to, operational state of hazard indicators, speed information, and/or operational state of lane change indicators of the corresponding vehicle.

The processor 302 may be configured to compare the determined count of the vehicles with a set of threshold values, such as a value "50". The set of threshold values may be dynamically determined for the portion 500b of the road 512, based on the confidence level retrieved from the MSDs received from the first set of vehicles 514. The processor 302 may be configured to determine that the updated data value, "information" in the payload data of the data field, additional data, of the received MSDs may be indicative of a potential collision of the second set of vehicles 514 with the obstacle 520. In instances, when the determined count exceeds the set of threshold values, the processor 302 may be configured to generate an alert based on the data value, "information" and the other received payload data. The generated alert may be transmitted to the TMC 104 via the communication network 108. The TMC 104 may broadcast the alert to notify the presence of the obstacle 510 at a reported location of the road 512 and the direction 518, to the second set of vehicles 516. The I/O devices of each of the second set of vehicles 516 may be configured to render the received alert to a driver of each of the second set of vehicles 516 to anticipate the obstacle 520.

With reference to FIG. 5C, there is shown a portion 500c of a road 522. The road 522 that may comprise the lanes 522a and 522b. A vehicle 524 and a set of vehicles 526 that may be in motion on the road 522. The set of vehicles 526 may comprise vehicles 526a, 526b, and 526c. The vehicle 524 and a set of vehicles 526 may be in motion along the lane 522a, in a direction 528. The vehicle 524 and the set of vehicles 526 may be communicatively coupled with the PSAP 102 and/or the TMC 104. The vehicle 504 and the set of vehicles 506 may correspond to the set of vehicles 106, as shown in FIG. 1. Further, various components and systems of the vehicle 524 and the set of vehicles 526 may be similar to that of the vehicle 106a of the set of vehicles 106, as shown in FIG. 3. The vehicles 524 may generate a minimum set of data (MSD), the data structure of which may be similar to the MSD data structure 400, as shown in FIG. 4.

In accordance with a third scenario, the various components and systems of the vehicle 524 may or may not be equipped with ADAS. In an instance, the vehicle 524 may be stuck on the lane 522a such that it may pose a threat of a collision to the oncoming set of vehicles 526. The CPU that controls the various components and systems of the vehicle 524 may be configured to update the additional data 430 of the MSD with the value, "threat". The CPU may be further configured to update payload data of the data fields, vehicle location and/or direction in the MSD, with the current location and direction of motion of the vehicle 524. The CPU that controls the various components and systems of the vehicle 524 may be further configured to update payload data of the other data fields. The CPU may be further configured to transmit the updated MSD to the PSAP 102, via the communication network 108. The PSAP 102 may be configured to generate an alert. The generated alert may be transmitted to the TMC 104 via the communication network 108. The TMC 104 may broadcast the alert to the set of vehicles 526. The alert may correspond to the presence of the vehicle 524 struck in the lane 522a at a reported location of the road 522 in the direction 528. In another instance, the PSAP 102 may directly communicate the generated alert to the set of vehicles 526, via the communication network 108. The CPU of each of the set of vehicles 526 may be configured to receive the generated alert. The I/O devices in the various components and systems of each of the set of vehicles 526 may be configured to render the received alert that may be useful for the drivers of each of the set of vehicles 526 to anticipate the presence of the vehicle 524 stuck in the lane 522a at a reported location of the road 522 in the direction 528.

Figure 6:
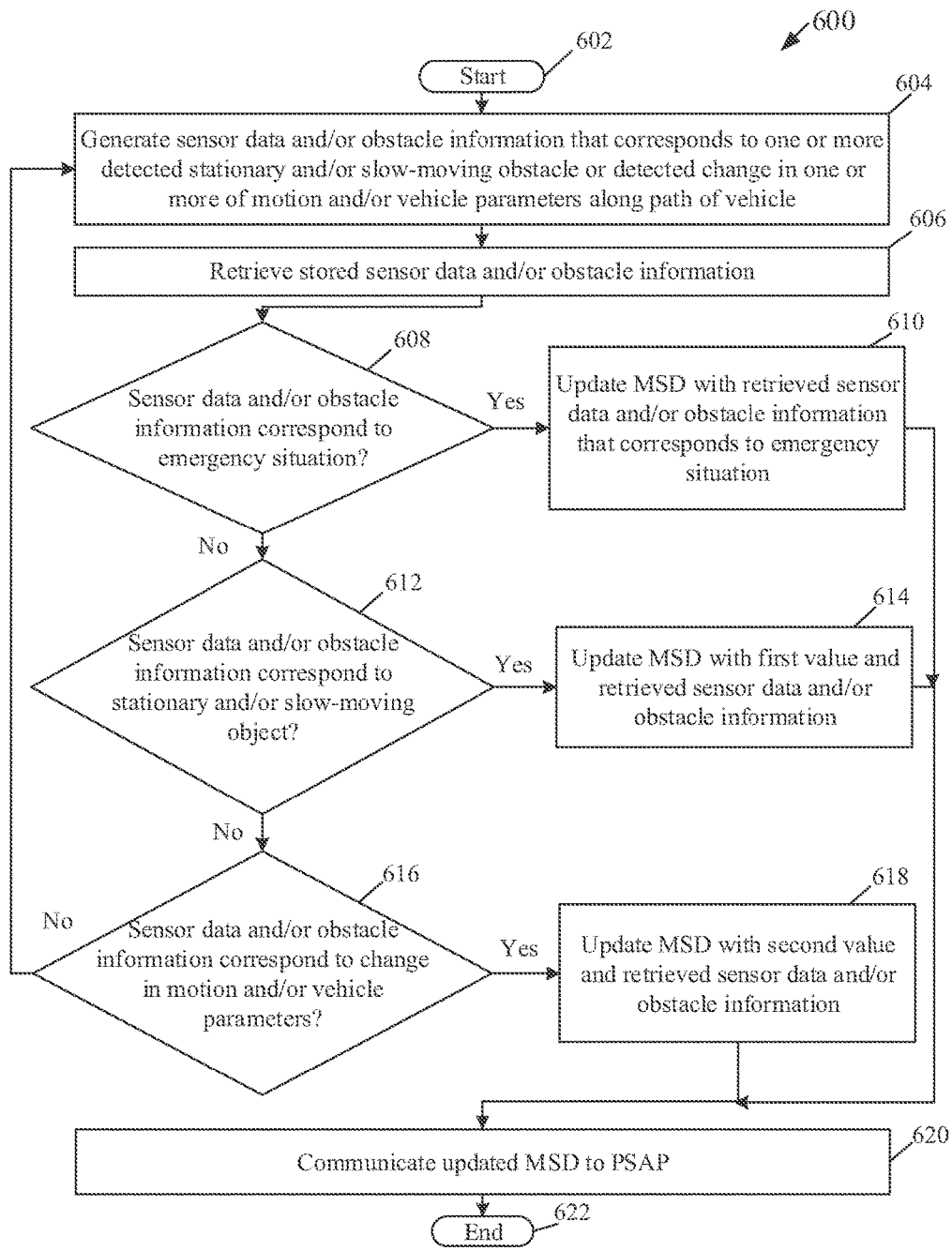
FIG. 6 comprises a first flowchart that illustrates a first exemplary method implemented in various components and systems of an exemplary vehicle for generation of a preventive alert, in accordance with an embodiment of the disclosure.

FIG. 6 comprises a first flowchart that illustrates a first exemplary method for generation of a preventive alert by a vehicle 106a (as shown in FIG. 2), in accordance with an embodiment of the disclosure. With reference to FIG. 6 there is shown a flowchart 600. The flowchart 600 is described in conjunction with FIG. 1 and FIG. 3. The method starts at step 602 and proceeds to step 604.

At step 604, sensor data and/or obstacle information may be generated by the sensing system 206 and/or imaging system 208 of the vehicle 106a. In accordance with an embodiment, when the vehicle 106a corresponds to the ADAS, the generated obstacle information may correspond to detection of one or more stationary and/or slow-moving obstacles. In accordance with an embodiment, when the vehicle 106a does not correspond to ADAS, the generated sensor data may correspond to a detection of a change in one or more of motion and/or vehicle parameters. The generated sensor data and/or obstacle information based on the detection of one or more stationary and/or slow-moving obstacles, and/or a change in one or more of motion and/or vehicle parameters, may be stored in the memory 204. In accordance with an embodiment, the generated sensor data and/or obstacle information may be stored in the memory 204. In accordance with an embodiment, the imaging device may correspond to a camera that may be mounted on the body of the vehicle 106a. In accordance with an embodiment, the imaging device may correspond to a camera that may be integrated in the body of the vehicle 106a.

At step 606, the stored sensor data and/or obstacle information may be retrieved from the memory 204 by the vehicle 106a. At step 608, it may be determined whether the generated sensor data and/or obstacle information corresponds to an emergency situation encountered by the vehicle 106a. The emergency situation may correspond to detection of an accident of the vehicle 106a, detection of deployed airbags, and/or a detected anomaly in the body control module 214, by the vehicle 106a. In instances when the generated sensor data and/or obstacle information corresponds to the emergency situation encountered by the vehicle 106a, the control passes to step 610. In instances when the generated sensor data and/or obstacle information does not correspond to the emergency situation encountered by the vehicle 106a, the control passes to step 712.

At step 610, the data field of the MSD may be updated with the retrieved sensor data and/or obstacle information that corresponds to the emergency situation encountered by the vehicle 106a. Further, the vehicle 106a may be configured to update the activation type 408 with a value, such as "automatically". Control passes to step 620.

At step 612, it may be determined whether the generated sensor data and/or obstacle information corresponds to a stationary and/or slow-moving obstacle. The generated sensor data and/or obstacle information may be based on the physical characteristics of the one or more stationary and/or slow-moving obstacles, such as a size greater or smaller than a pre-defined threshold. The physical characteristics may be determined based on one or more images captured by the imaging system 208. The physical characteristics may further include a type of detected one or more stationary and/or slow-moving obstacles, such as a vehicle, a truck, a pedestrian, a cyclist or a motorcyclist. The physical characteristics may further include an orientation with respect to center of the path, and/or a speed of motion of the one or more stationary and/or slow-moving obstacles with respect to the one or more vehicles. The orientation may be determined based on monitoring of the steering wheel and/or the electric motor associated with the steering system 220 (as explained in FIG. 2). The generated sensor data and/or obstacle information may be based on one or more characteristics of the road, such as a blind spot or a curve, or a type of a road. The type of the road may include, but is not limited to, a service road, a highway, and/or the like. The generated sensor data and/or obstacle information may be further based on brightness level information of the environment outside the one or more vehicles along the path.

In instances when the generated sensor data and/or obstacle information corresponds to the stationary and/or slow-moving obstacles, the control passes to step 614. In instances when the generated sensor data and/or obstacle information does not correspond to the stationary and/or slow-moving obstacles, the control passes to step 616.

At step 614, the data field of the MSD may be updated with the retrieved sensor data and/or obstacle information that corresponds to the detected stationary and/or slow-moving obstacle. Further, the CPU 202 of the vehicle 106a may be configured to update the additional data 430 of the MSD with the first value and the activation type 408 with a value, such as "manually". The first value in the payload data 404 for the additional data 430 may correspond to the value, "threat". The MSD may be further updated with a danger level information of the one or more stationary and/or slow-moving obstacles. The CPU 202 of the vehicle 106a may be further configured to update the additional data 430 of the MSD with the value "danger" that corresponds to the danger level information. The danger level information may be based on the physical characteristics of the one or more stationary and/or slow-moving obstacles, such as a size greater or smaller than a pre-defined threshold. The danger level information may be set to a value "high" when the size of the one or more stationary and/or slow moving object exceeds a pre-defined threshold. The danger level may be set to a value "high" when brightness level information of environment outside the one or more vehicles along the path is less than a brightness threshold. The danger level may be set to a value "high" when an acceleration higher than a pre-defined acceleration is detected for the one or more stationary and/or slow moving object.

The MSD may be further updated with a confidence level that corresponds to detection of the one or more stationary and/or slow-moving obstacles. The CPU 202 of the vehicle 106a may be further configured to update the additional data 430 of the MSD with the value "unconfident" that corresponds to the low confidence level. The low confidence level may be based on the physical characteristics of the one or more stationary and/or slow-moving obstacles, such as a size greater or smaller than a pre-defined threshold. The confidence level may be low when the size of the one or more stationary and/or slow moving object is less than a pre-defined threshold. The confidence level may be set to a value low when brightness level information of environment outside the one or more vehicles along the path is less than a brightness threshold. The confidence level may be low when speed of the set of vehicles 106 exceeds a pre-defined speed threshold. Control passes to step 620.

At step 616, it may be determined whether the generated sensor data and/or obstacle information corresponds to a change in one or more of motion and/or vehicle parameters associated with one or more stationary and/or slow-moving obstacles. The generated one or more of motion and/or vehicle parameters may be based on the physical characteristics of the one or more stationary and/or slow-moving obstacles, such as a size greater or smaller than a pre-defined threshold. The generated one or more of motion and/or vehicle parameters may be based on a type of detected one or more stationary and/or slow-moving obstacles, such as a life-form. The generated one or more of motion and/or vehicle parameters may be based on an orientation with respect to a lane marking on a path. The generated sensor data and/or obstacle information may be based on deceleration of the set of vehicles 106 at a location different from the location of the one or more stationary and/or slow-moving obstacles. The deceleration of the set of vehicles 106 may be based on monitoring of wheels by the powertrain control module 216, monitoring of the power transmitted from the engine of a vehicle to the transmission system of the vehicle, and/or the braking system 218, by the CPU 202 and/or the powertrain control module 216. The sensor data and/or obstacle information may be further generated when adjustment of a position of the steering wheel is detected with respect to the position of the steering wheel of the one or more stationary and/or slow-moving obstacles.

In instances when the generated sensor data and/or obstacle information corresponds to the change in one or more of motion and/or vehicle parameters, the control passes to step 618. In instances when the generated sensor data and/or obstacle information does not correspond to the change in one or more of motion and/or vehicle parameters, the control passes to step 604.

At step 618, the data field of the MSD may be updated with the retrieved sensor data and/or obstacle information that corresponds to the detected change in one or more of motion and/or vehicle parameters. Further, the CPU 202 of the vehicle 106a may be configured to update the additional data 430 of the MSD with the second value and the activation type 408 with a value, such as "manually". The second value in the payload data 404 for the additional data 430 may correspond to the value, "information". The MSD may be further updated with a danger level information that corresponds to the detected change in one or more motion and/or vehicle parameters of the one or more stationary and/or slow-moving obstacles. The CPU 202 of the vehicle 106a may be further configured to update the additional data 430 of the MSD with the value "danger" that corresponds to the danger level information. The danger level information may be based on the physical characteristics of the one or more stationary and/or slow-moving obstacles, such as a size greater or smaller than a pre-defined threshold. The danger level information may be set to a value "high" when the size of the one or more stationary and/or slow moving object exceeds a pre-defined threshold. The danger level may be set to a value "high" when brightness level information of environment outside the one or more vehicles along the path is less than a brightness threshold. The danger level may be set to a value "high" when an acceleration higher than a pre-defined acceleration is detected for the one or more stationary and/or slow moving object.

The MSD may be further updated with a confidence level that corresponds to detection of the one or more stationary and/or slow-moving obstacles. The CPU 202 of the vehicle 106a may be further configured to update the additional data 430 of the MSD with the value "unconfident" that corresponds to the low confidence level. The low confidence level may be based on the physical characteristics of the one or more stationary and/or slow-moving obstacles, such as a size greater or smaller than a pre-defined threshold. The confidence level may be low when the size of the one or more stationary and/or slow moving object is less than a pre-defined threshold. The confidence level may be set to a value low when brightness level information of environment outside the one or more vehicles along the path is less than a brightness threshold. The confidence level may be low when speed of the set of vehicles 106 exceeds a pre-defined speed threshold. Control passes to step 620.

At step 620, the CPU 202 of the vehicle 106a may be configured to communicate the updated MSD to the PSAP 102, by use of the communication channel 212a of the wireless communication system 212. In accordance with an embodiment of the disclosure, a preventive alert indicating an imminent threat of collision or a potential threat of collision may be generated by the PSAP 102 based on the updated MSD communicated to the PSAP 102. The preventive alert may be communicated to the TMC 104 based on a standardized data format of the MSD. Such a standardized format may corresponds to the MSD used for the emergency call (in accordance with 3GPP TS 22.101) by use of a standardized infrastructure. In accordance with an embodiment, the CPU 202 of the vehicle 106a of one or more other vehicles may be configured to receive the alert generated by the PSAP 102 that may be rendered at the display device 210a and/or the audio interface 210b of the I/O system 210 of the one or more other vehicles. In accordance with an embodiment, the alert may be received directly from the PSAP 102. In accordance with an embodiment, the alert may be received from the PSAP 102, via the TMC 104. Control passes to the end step 622.

Figure 7A:
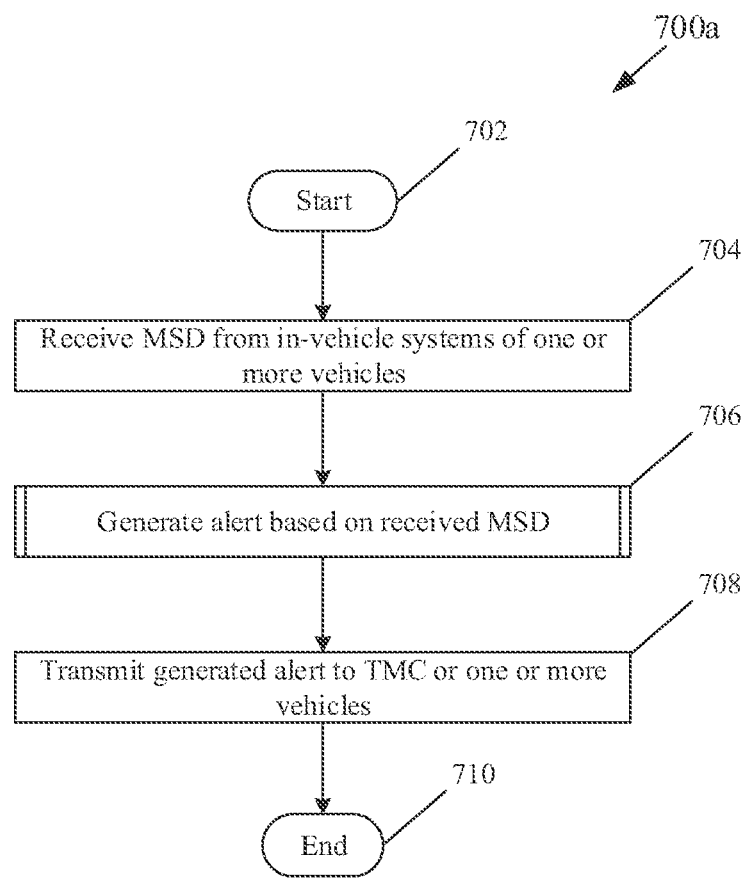
FIGS. 7A and 7B collectively comprise a second flowchart that illustrates a second exemplary method implemented in a server for generation of a preventive alert, in accordance with an embodiment of the disclosure.
Figure 7B:
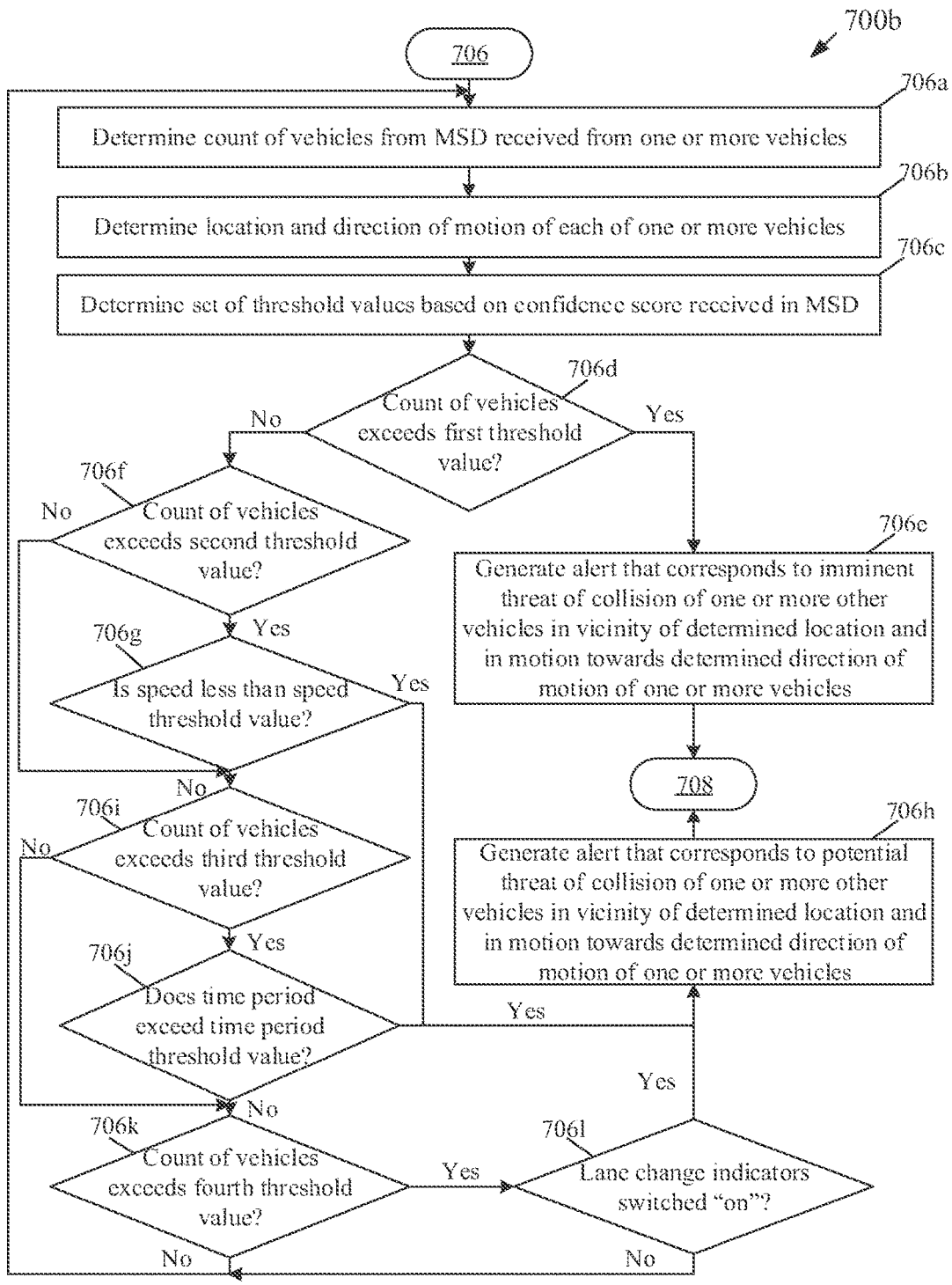

FIGS. 7A and 7B collectively comprise a second flowchart that illustrates a second exemplary method for generation of a preventive alert by the PSAP 102 (as shown in FIG. 1), in accordance with an embodiment of the disclosure. With reference to FIG. 7A there is shown a flowchart 700a. The flowchart 700a is described in conjunction with FIG. 1. The method starts at step 702 and proceeds to step 704.

At step 704, the PSAP 102 may be configured to receive a MSD from the various components and systems of the one or more vehicles from the set of vehicles 106, via the communication network 108. The received MSD may comprise at least a first value and/or a second value. At step 706, the PSAP 102 may be configured to generate an alert based on at least the received set of data. The method of generation of the alert based on the received MSD, in accordance with step 706, is further described in FIG. 7B. At step 708, the PSAP 102 may be configured to transmit the generated alert to the TMC 104 or the one or more vehicles. The control passes to end step 710.

With reference to FIG. 7B there is shown a flowchart 700b for step 706 (as shown in FIG. 7A). The flowchart 700b for step 706 is described in conjunction with FIGS. 1 to 4 and FIG. 7A. The method starts at step 706a and proceeds to step 706b.

At step 706a, the processor 302 may be configured to determine a count of the vehicles from the MSD received from one or more vehicles of the set of vehicles 106. The data field in the received MSD may correspond to the first value and/or the second value. At step 706b, the processor 302 may be configured to determine a location and a direction of motion of each of the one or more vehicles, for which the data field in the MSD corresponds to the first value and/or the second value. In accordance with an embodiment, the MSD may comprise a confidence level that corresponds to a type of the sensing devices of the sensing system 206 that detect the obstacle information.

At step 706c, the processor 302 may be configured to determine a set of threshold values based on the confidence level received in the MSD. In accordance with an embodiment, the determined set of threshold values may comprise a first threshold value, a second threshold value, a third threshold value, and/or a fourth threshold value.

At step 706d, it may be determined whether the count of the vehicles for which the MSD corresponds to the first value exceeds the first threshold value. In instances when the count of the vehicles for which the data field in the MSD corresponds to the first value exceeds a first threshold value, the control passes to step 706e. In instances when the count of the vehicles for which the data field in the MSD corresponds to the first value does not exceed a first threshold value, the control passes to step 706f.

At step 706e, the processor 302 may be configured to generate an alert that may indicate an imminent threat of collision of one or more other vehicles in the vicinity of the determined location that may be in motion towards the determined direction of motion of the one or more vehicles. At step 706f, it may be determined whether the count of the vehicles for which the MSD corresponds to the second value exceeds the second threshold value. In instances when the count of the vehicles for which the MSD corresponds to the second value exceeds the second threshold value, the control passes to step 706g. In instances when the count of the vehicles for which the MSD corresponds to the second value does not exceed the second threshold value, the control passes to step 706i.

At step 706g, it may be determined whether speed of the one or more vehicles from the set of vehicles 106, for which the MSD corresponds to the second value is less than a speed threshold value. In instances when speed of the one or more vehicles for which the MSD corresponds to the second value, is less than a speed threshold value, the control passes to step 706h. At step 706h, the processor 302 may be configured to generate an alert that corresponds to a potential threat of collision of other set of vehicles in the vicinity of the determined location that may be in motion towards the determined direction of motion of the one or more vehicles. In instances when speed of the one or more vehicles for which the MSD corresponds to the second value is not less than a speed threshold value, the control passes to step 706i.

At step 706i, it may be determined whether the count of the vehicles for which the MSD corresponds to the second value exceeds the third threshold value. In instances when the count of the vehicles for which the MSD corresponds to the second value exceeds the third threshold value, the control passes to step 706*j*. In instances when the count of the vehicles for which the MSD corresponds to the second value does not exceed the third threshold value, the control passes to step 706*k*.

At step 706*j*, it may be determined whether time period for which the hazard indicators of the one or more vehicles from the set of vehicles 106 are switched ON, exceeds a time period threshold value. In instances when the time period for which the hazard indicators of the one or more vehicles are switched ON exceeds a time period threshold value, the control passes to step 706*h*. In instances when the time period for which the hazard indicators of the one or more vehicles are switched ON does not exceed a time period threshold value, the control passes to step 706*k*.

At step 706*k*, it may be determined whether the count of the vehicles for which the MSD corresponds to the second value exceeds the fourth threshold value. In instances when the count of the vehicles for which the MSD corresponds to the second value exceeds the fourth threshold value, the control passes to step 706*l*. In instances when the count of the vehicles for which the MSD corresponds to the second value does not exceed the fourth threshold value, the control passes back to step 706*a*.

At step 706*l*, it may be determined whether operational states of the lane change indicators of the one or more vehicles from the set of vehicles 106 are switched ON. In instances when the operational state of the lane change indicators of the one or more vehicles is switched ON, the control passes to step 706*h*. In instances when the operational state of the lane change indicators of the one or more vehicles is switched OFF, the control passes back to step 706*a*. The flowchart 700*a* (FIG. 7A) resumes at step 706*e* and 706*h*.

In accordance with an embodiment of the disclosure, the information processing system for generation of a preventive alert may comprise one or more circuits in a vehicle, such as the CPU 202 (as shown in FIG. 2). The CPU 202 may be configured to retrieve sensor data associated with the vehicle and/or obstacle information along a path of the vehicle. The obstacle information may be generated by one or more sensors of the vehicle. The CPU 202 may be further configured to communicate to a server, a set of data based on the retrieved sensor data and/or the retrieved obstacle information. The generation of an alert to one or more other vehicles may be controlled by the PSAP 102 based on the communicated set of data.

In accordance with an embodiment of the disclosure, the system for generation of a preventive alert may comprise one or more circuits, such as the processor 302 (as shown in FIG. 3). The processor 302 may be configured to receive a set of data from one or more vehicles. The received set of data may comprise sensor data of the one or more vehicles and/or obstacle information along a path of the one or more vehicles. The processor 302 may be further configured to control generation of an alert to one or more other vehicles based on the received set of data.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for generation of a preventive alert by use of an information processing system. The at least one code section may cause the machine and/or computer to perform the steps that comprise retrieval of sensor data associated with the vehicle and/or obstacle information along a path of the vehicle. The retrieved sensor data and/or the obstacle information may be generated by one or more sensors of the vehicle. Based on the retrieved sensor data and/or the retrieved obstacle information along the path of the vehicle, a set of data may be communicated to a server. The generation of an alert to one or more other vehicles may be controlled by the server based on the communicated set of data.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for generation of a preventive alert. The at least one code section may cause the machine and/or computer to perform the steps that comprise receipt of a set of data from one or more vehicles. The received set of data may comprise sensor data of the one or more vehicles and/or obstacle information along a path of the one or more vehicles. Based on the received set of data, generation of an alert to the one or more other vehicles may be controlled.

In accordance with an embodiment of the disclosure, the vehicle 106*a* (FIG. 1) may include at least the battery 224 associated with the vehicle power system 222 (FIG. 2), the sensing system 206 (FIG. 2), the imaging system 208 (FIG. 2), the input/output (I/O) system 210 (FIG. 2), and/or the central processing unit (CPU) 202 (FIG. 2). The sensing system 206 of the vehicle 106*a* may be configured to generate sensor data and/or obstacle information associated with the vehicle 106*a*. The imaging system 208 may be configured to capture one or more images along a path of the vehicle 106*a*. The I/O system 210 may be configured to render an alert generated by a server, such as the PSAP 102. The I/O system 210 may be powered by the battery 224. The CPU may comprise one or more circuits that may be configured to retrieve the generated sensor data and/or the generated obstacle information associated with the vehicle 106*a*, along the path of the vehicle 106*a*. The one or more circuits may be further configured to communicate to the PSAP 102, a set of data based on the retrieved sensor data and/or the retrieved obstacle information. The generation of an alert to one or more other vehicles may be controlled by the PSAP 102 based on the communicated set of data.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A signal processing system for a first vehicle, comprising:
   a central processing unit (CPU) configured to:
   generate first obstacle information based on sensor data from at least one sensor,
      wherein said first obstacle information is indicative of a plurality of obstacles along a path of travel of said first vehicle;
   generate a first minimum set of data (MSD) that includes a payload of eCall standard data and additional data, wherein
      said additional data comprises said first obstacle information, speed information of said first vehicle, and danger level information of at least one obstacle of said plurality of obstacles,
      said danger level information indicates a likelihood of a collision of said first vehicle with said at least one obstacle of said plurality of obstacles, and
      said likelihood of said collision is based on at least one of an acceleration of said at least one obstacle with respect to said first vehicle that exceeds a threshold acceleration value, or brightness level information of environment outside said first vehicle;
   transmit said first MSD to a server;
   receive alert information from said server, wherein
      said server receives a second MSD including speed information of a second vehicle and second obstacle information from said second vehicle in said path of travel of said first vehicle, and
      said server generates said alert information based on said speed information of said second vehicle; and
   render an alert based on said alert information.

2. The signal processing system according to claim 1, wherein said alert is at least one of audio-visual information, haptic information, audio information, voice-based broadcast message, text-based broadcast message, or activation of an alarm in said second vehicle.

3. The signal processing system according to claim 1, wherein said CPU is further configured to render said alert by at least one of a dashboard indication, a vibration of a steering wheel of said first vehicle, or an audio system of said first vehicle.

4. The signal processing system according to claim 1, wherein
   said first MSD further includes a field that indicates presence of said at least one obstacle along said path of travel of said first vehicle, and
   said at least one obstacle corresponds to at least one of a stationary obstacle or a slow-moving obstacle.

5. The signal processing system according to claim 4, wherein
   said first vehicle further comprises at least one imaging device configured to detect said at least one of said stationary obstacle or said slow-moving obstacle, and
   said CPU is further configured to:
      update said first MSD based on said detection of said at least one of said stationary obstacle or said slow-moving obstacle; and
      transmit said updated first MSD to said server.

6. The signal processing system according to claim 1, wherein said alert information is indicative of a threat of said collision in at least one of a threshold distance from said first vehicle, or said path of travel of said first vehicle.

7. A method, comprising:
   in a first vehicle,
      receiving sensor data;
      generating first obstacle information based on said sensor data,
         wherein said first obstacle information is indicative of a plurality of obstacles along a path of travel of said first vehicle;
      generating a first minimum set of data (MSD) that includes a payload of eCall standard data and additional data, wherein
         said additional data comprises said first obstacle information, speed information of said first vehicle, and danger level information of at least one obstacle of said plurality of obstacles,
         said danger level information indicates a likelihood of a collision of said first vehicle with said at least one obstacle of said plurality of obstacles, and
         said likelihood of said collision is based on at least one of an acceleration of said at least one obstacle with respect to said first vehicle that exceeds a threshold acceleration value, or brightness level information of environment outside said first vehicle;
      transmitting said first MSD to a server;
      receiving alert information from said server, wherein
         said server receives a second MSD including speed information of a second vehicle and second obstacle information from said second vehicle in said path of travel of said first vehicle, and
         said server generates said alert information based on said speed information of said second vehicle; and
      rendering an alert based on said alert information.

8. The method according to claim 7, wherein said alert is at least one of audio-visual information, haptic information, audio information, voice-based broadcast message, text-based broadcast message, or activation of an alarm in said second vehicle.

9. The method according to claim 7, wherein said alert is rendered by at least one of a dashboard indication, a vibration of a steering wheel of said first vehicle, or an audio system of said first vehicle.

10. The method according to claim 7, wherein
   said first MSD further includes a field that indicates presence of said at least one obstacle along said path of travel of said first vehicle, and
   said at least one obstacle corresponds to at least one of a stationary obstacle or a slow-moving obstacle.

11. The method according to claim 10, further comprising:
   detecting said at least one of said stationary obstacle or said slow-moving obstacle;

updating said first MSD based on said detection of said at least one of said stationary obstacle or said slow-moving obstacle; and transmitting said updated first MSD to said server.

12. The method according to claim 7, wherein said alert information is indicative of a threat of said collision in at least one of a threshold distance from said first vehicle, or said path of travel of said first vehicle.

13. A non-transitory computer-readable storage medium having stored thereon computer executable instructions, which when executed by a computer, cause said computer to execute operations, said operations comprising:
in a first vehicle,
receiving sensor data;
generating first obstacle information based on said sensor data,
wherein said first obstacle information is indicative of a plurality of obstacles along a path of travel of said first vehicle;
generating a first minimum set of data (MSD) that includes a payload of eCall standard data and additional data, wherein
said additional data comprises said first obstacle information, speed information of said first vehicle, and danger level information of at least one obstacle of said plurality of obstacles,
said danger level information indicates a likelihood of a collision of said first vehicle with said at least one obstacle of said plurality of obstacles, and
said likelihood of said collision is based on at least one of an acceleration of said at least one obstacle with respect to said first vehicle that exceeds a threshold acceleration value, or brightness level information of environment outside said first vehicle;
transmitting said first MSD to a server;
receiving alert information from said server, wherein
said server receives a second MSD including speed information of a second vehicle and second obstacle information from said second vehicle in said path of travel of said first vehicle, and
said server generates said alert information based on said speed information of said second vehicle; and
rendering an alert based on said alert information.

14. The signal processing system according to claim 1, wherein said first obstacle information corresponds to at least one of a stationary obstacle on said path of travel of said first vehicle or a moving obstacle on said path of travel of said first vehicle.

15. The signal processing system according to claim 1, wherein
said likelihood of said collision is further based on a size of said at least one obstacle of said plurality of obstacles,
said first vehicle further comprises at least one imaging device configured to detect at least one of a stationary obstacle or a slow-moving obstacle along said path of travel of said first vehicle, and
said danger level information indicates said likelihood of said collision of said first vehicle with said at least one of said stationary obstacle or said slow-moving obstacle.

16. The signal processing system according to claim 15, wherein said CPU is further configured to set said danger level information to a high value based on at least one of:
said size of said at least one of said stationary obstacle or said slow-moving obstacle that exceeds a size threshold value,
said brightness level information of said environment outside said first vehicle that is less than a brightness threshold value, or
said acceleration of said at least one of said stationary obstacle or said slow-moving obstacle that is higher than said threshold acceleration value.

17. The signal processing system according to claim 1, wherein
said CPU is further configured to determine confidence level information of presence of said plurality of obstacles based on said sensor data, and
said additional data includes said confidence level information.

18. The signal processing system according to claim 1, wherein said CPU is further configured to:
determine confidence level information based on a type of said at least one sensor; and
update said additional data based on said determined confidence level information.

19. The signal processing system according to claim 1, further comprising said at least one sensor configured to output said sensor data.

20. A first vehicle, comprising:
at least one sensor configured to output sensor data; and
a central processing unit (CPU) configured to:
generate first obstacle information based on said sensor data,
wherein said first obstacle information is indicative of a plurality of obstacles along a path of travel of said first vehicle;
generate a first minimum set of data (MSD) that includes a payload of eCall standard data and additional data, wherein
said additional data comprises said first obstacle information, speed information of said first vehicle, and danger level information of at least one obstacle of said plurality of obstacles,
said danger level information indicates a likelihood of a collision of said first vehicle with said at least one obstacle of said plurality of obstacles, and
said likelihood of said collision is based on at least one of an acceleration of said at least one obstacle with respect to said first vehicle that exceeds a threshold acceleration value, or brightness level information of environment outside said first vehicle;
transmit said first MSD to a server;
receive alert information from said server, wherein
said server receives a second MSD including speed information of a second vehicle and second obstacle information from said second vehicle in said path of travel of said first vehicle, and
said server generates said alert information based on said speed information of said second vehicle; and
render an alert based on said alert information.

* * * * *